(12) United States Patent
Ko et al.

(10) Patent No.: US 9,323,772 B2
(45) Date of Patent: Apr. 26, 2016

(54) SEGMENT GROUP-BASED SEGMENT CLEANING APPARATUS AND METHODS FOR STORAGE UNITS

(71) Applicant: Samsung Electronics Co., Ltd., Suwon-si, Gyeonggi-do (KR)

(72) Inventors: Seok-Young Ko, Yuseong-gu (KR); Jae-Geuk Kim, Hwasung-si (KR); Joo-Young Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 279 days.

(21) Appl. No.: 14/046,515

(22) Filed: Oct. 4, 2013

(65) Prior Publication Data

US 2014/0101115 A1    Apr. 10, 2014

(30) Foreign Application Priority Data

Oct. 5, 2012    (KR) ........................ 10-2012-0110673

(51) Int. Cl.
   *G06F 17/30* (2006.01)
(52) U.S. Cl.
   CPC .... *G06F 17/30129* (2013.01); *G06F 17/30138* (2013.01); *G06F 17/30191* (2013.01)
(58) Field of Classification Search
   None
   See application file for complete search history.

(56) References Cited

U.S. PATENT DOCUMENTS

| | | | |
|---|---|---|---|
| 5,530,850 A | 6/1996 | Ford et al. | |
| 5,933,840 A | 8/1999 | Menon et al. | |
| 7,428,560 B1 | 9/2008 | Detlefs et al. | |
| 7,509,471 B2 | 3/2009 | Gorobets | |
| 8,041,883 B2 | 10/2011 | Biswas et al. | |

FOREIGN PATENT DOCUMENTS

| | | |
|---|---|---|
| JP | 2006-39877 A | 2/2006 |
| JP | 2007-213252 A | 8/2007 |
| KR | 10-1067018 B1 | 10/2010 |
| KR | 10-1017067 B1 | 2/2011 |
| KR | 10-2012-0039166 A | 4/2012 |

OTHER PUBLICATIONS

Matthews, Improving the Performance of Log-Structured File Systems with Adaptive Methods, 2007, pp. 238-251.*

(Continued)

*Primary Examiner* — Albert Phillips, III
(74) *Attorney, Agent, or Firm* — Myers Bigel & Sibley, P.A.

(57) ABSTRACT

Victim segments to be returned to a free area in a segment cleaning process from a plurality of segments included in each segment group are selected by using a method corresponding to the segment group. A host comprises an interface relaying data exchange with a storage device; and a file system module performing a segment cleaning process by selecting victim segment from a plurality of segments stored in the storage device, discovering live blocks in each of the victim segments, writing back the discovered live blocks to the storage device through the interface, and returning the victim segments to a free area. The file system module calculates victim points for all segments included in a first segment group using a first victim point calculation formula, calculates victim points for all segments included in a second segment group using a second victim point calculation formula, and selects the victim segments based on the victim points.

8 Claims, 18 Drawing Sheets

(56) References Cited

OTHER PUBLICATIONS

Rosenblum, The Design and Implementation of a Log-Structured File System, 1991 pp. 1-15.*

Min, SFS: Random Write Considered Harmful in Solid State Drives, Feb. 17, 2012, 18 pages.*

Wang, A Novel Reordering Write Buffer to Improve Write Performance of Log-Structured File Systems, IEEE Transactions on Computers, vol. 52, No. 12, Dec. 2003, p. 1559-1572.*

* cited by examiner

FIG. 11

| NODE ID | PHYSICAL ADDRESS |
|---------|------------------|
| N0 | a |
| N1 | b |
| N2 | c |
| ⋮ | ⋮ |

SEGMENT GROUP-BASED SEGMENT CLEANING APPARATUS AND METHODS FOR STORAGE UNITS

CROSS REFERENCE TO RELATED APPLICATION

This application claims priority from Korean Patent Application No. 10-2012-0110673 filed on Oct. 5, 2012 in the Korean Intellectual Property Office, the disclosure of which is incorporated herein by reference in its entirety.

BACKGROUND

The present inventive concepts relate to segment cleaning apparatus and methods, and more particularly, to a host which performs segment cleaning applicable to a file system that supports a log-structured file system and related segment cleaning methods.

A log-structured file system has been suggested in a server storage system that uses a hard disk drive. Since the hard disk drive is a device that uses a rotary motor, it has seek latency and rotational latency. Therefore, the log-structured file system configures the entire disk as one log and performs a sequential write operation only. That is, when modifying a file, the log-structured file system does not modify data at the original position. Instead, the log-structured file system adds modified data at the end of the log.

Therefore, the log is continuously extended in one direction. When the log cannot be extended any further as a result of continuous data modification and addition, segment cleaning is performed to return some segments ("victim segments") included in the log to a free area in which data can be stored. Of blocks included in the victim segments, "live blocks" including valid data are written back at the end of the log. Thus, data is not lost despite the segment cleaning.

One of the operations in the segment cleaning is to select victim segments. As described above, live blocks included in each victim segment should be written back at the end of the log. Therefore, as the number of live blocks included in each victim segment increases, the I/O load of the write-back operation may increase. Hence, a segment which includes a low proportion of live blocks relative to the total number of blocks therein may be selected as a victim segment.

SUMMARY

Aspects of the present inventive concepts provide a host which selects victim segments to be returned to a free area in a segment cleaning process from a plurality of segments included in each segment group by using a method corresponding to the segment group.

Aspects of the present inventive concepts also provide a host which selects victim segments to be returned to a free area in a segment cleaning process from a plurality of segments included in each segment group by using a method corresponding to the segment group if newly written data, updated data, and written-back data are stored in different segment groups.

Aspects of the present inventive concepts also provide a method of selecting victim segments to be returned to a free area in a segment cleaning process from a plurality of segments included in each segment group by using a method corresponding to the segment group.

However, aspects of the present inventive concepts are not restricted to the ones set forth herein. The above and other aspects of the present inventive concepts will become more apparent to one of ordinary skill in the art to which the present inventive concepts pertain by referencing the detailed description of the present inventive concepts given below.

According to an aspect of the present inventive concepts, there is provided a host comprising an interface configured to relay data exchange with a storage device and a file system module performing a segment cleaning process by performing operations comprising selecting victim segments from a plurality of segments stored in the storage device, discovering live blocks in the victim segments, writing back the discovered live blocks to the storage device through the interface, and returning the victim segments to a free area. The file system module is further configured to perform operations comprising calculating victim points for segments included in a first segment group using a first victim point calculation formula, calculating victim points for segments included in a second segment group using a second victim point calculation formula, and selecting the victim segments based on the victim points.

According to another aspect of the present inventive concepts, there is provided a segment cleaning method comprising selecting victim segments from a plurality of segments stored in a storage device, discovering live blocks in the victim segments, writing back the discovered live blocks to the storage device and returning the victim segments to a free area. The selecting of the victim segments comprises calculating victim points for segments included in a first segment group using a first victim point calculation formula, calculating victim points for segments included in a second segment group using a second victim point calculation formula and selecting the victim segments based on the victim points.

According to yet another aspect of the present inventive concepts, there is provided a method for selecting victim segments from a plurality of segments stored in a storage device. The method comprises determining a first victim point for a first segment group of the plurality of segments based on an age of live blocks in the first segment group and amount of the live blocks in the first segment group, determining a second victim point for a second segment group of the plurality of segments based on an amount of live blocks in the second segment group and independent of an age of the live blocks in the second segment group, and selecting the victim segments by comparing the first and second victim points.

BRIEF DESCRIPTION OF THE DRAWINGS

The above and other aspects and features of the present inventive concepts will become more apparent by describing in detail example embodiments thereof with reference to the attached drawings, in which:

FIG. 11 is a diagram illustrating a node address table (NAT);

DETAILED DESCRIPTION

The present inventive concepts will now be described more fully hereinafter with reference to the accompanying drawings, in which various embodiments of the inventive concepts are shown. The inventive concepts may, however, be embodied in different forms and should not be construed as limited to the embodiments set forth herein. Rather, these embodiments are provided so that this disclosure will be thorough and complete, and will filly convey the scope of the inventive concepts to those skilled in the art. The same reference numbers indicate the same components throughout the specification.

Unless defined otherwise, all technical and scientific terms used herein have the same meaning as commonly understood by one of ordinary skill in the art to which the inventive concepts belong. It is noted that the use of any and all examples, or example terms provided herein is intended merely to better illuminate the inventive concepts and is not a limitation on the scope of the inventive concepts unless otherwise specified. Further, unless defined otherwise, all terms defined in generally used dictionaries may not be overly interpreted.

Figure 1:
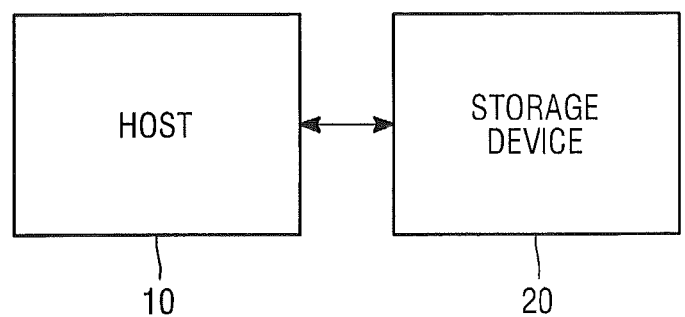
FIG. 1 is a block diagram of a computing system according to an embodiment of the present inventive concepts.

Referring to FIG. 1, a computing system 1 according to an embodiment of the present inventive concepts includes a host 10 and a storage device 20.

The host 10 may be implemented in a computer, an ultra-mobile PC (UMPC), a workstation, a net-book, a personal digital assistant (PDA), a portable computer, a web tablet, a wireless phone, a mobile phone, a smart phone, an e-book, a portable multimedia player (PMP), a portable game device, a navigation device, a black box, a digital camera, a three-dimensional television, a digital audio recorder, a digital audio player, a digital picture recorder, a digital picture player, a digital video recorder, a digital video player, a device capable of transmitting/receiving information in wireless environments, one of various electronic devices constituting a home network, one of various electronic devices constituting a computer network, one of various electronic devices constituting a telematics network, a radio frequency identification (RFID) device, or one of various components constituting a computing system.

The host 10 and the storage device 20 exchange data with each other using a predetermined protocol. For example, the host 10 and the storage device 20 may communicate with each other using at least one of various interface protocols such as, but not limited to, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol.

The host 10 controls the storage device 20. For example, the host 10 may write data to the storage device 20 or read data from the storage device 20.

The storage device 20 may be, but is not limited to, a card storage device (e.g., a static solid disk (SSD), a hard disk drive (HDD) or an eMMC) or a data server.

Figure 2:
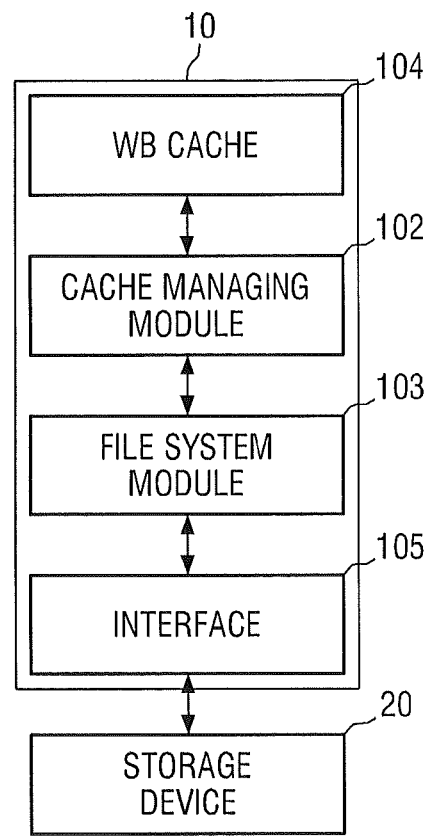
FIG. 2 is a block diagram of a host shown in FIG. 1.

FIG. 2 is a block diagram of the host 10 shown in FIG. 1.

Referring to FIG. 2, the host 10 may include a write-back (WB) cache 104 which is used to write data to the storage device 20, a cache managing module 102 which manages the WB cache 104, and an interface 105 which relays data exchange between a file system module 103 and the storage device 20.

Each component shown in FIG. 2 may include, but is not limited to, a software component or a hardware component such as a Field Programmable Gate Array (FPGA) or Application Specific Integrated Circuit (ASIC). Each component may advantageously be configured to reside on the addressable storage medium and configured to execute on one or more processors. The functionality provided for in the components may be further separated into additional components or may be combined into fewer components.

The interface 105 may support the protocol used for data exchange between the host 10 and the storage device 20. The interface 105 may include a connector for data cable connection and a logic for processing data transmission and reception.

The file system module 103 selects victim segments from a plurality of segments stored in the storage device 20, discovers live blocks included in the victim segments, writes back the discovered live blocks to the storage device 20 through the interface 105, and returns the victim segments to a free area. That is, the file system module 103 performs segment cleaning. The operation of the file system module 103 will now be described in greater detail.

The file system module 103 calculates victim points of segments included in each segment group using a victim point calculation formula corresponding to the segment group and selects victim segments based on the victim points. For example, the file system module 103 may calculate victim points for all segments included in a first segment group using a first victim point calculation formula and calculate victim points for all segments included in a second segment group using a second victim point calculation formula.

A segment group consists of a plurality of segments. The number of segments included in each segment group may be equal or may be different according to characteristics of each segment group. Alternatively, the number of segments in each segment group may increase or decrease depending on data write or segment cleaning conditions.

According to an embodiment of the present inventive concepts, a segment group may consist of segments located in a certain address area. According to another embodiment, the segments included in the segment group may consist of blocks written for the same reason. For example, the storage device 20 may include a first segment group consisting of segments which include newly written data, a second segment group consisting of segments which include data written when the data included in the segments of the first segment group is updated, and a third segment group consisting of segments which include valid data that is included in the segments of the first and second segment groups and written back as a result of segment cleaning.

A victim point calculation formula may correspond to each segment group. When selecting victim segments from segments included in a log area in order for segment cleaning, the file system module 103 identifies a segment group to which each segment belongs and calculates a victim point by applying a victim point calculation formula, which corresponds to the segment group, to the segment. After calculating victim points for all segments included in the log area, the file system module 103 selects victim segments based on the victim points. Here, the file system module 103 may select a predetermined number of victim segments from each segment group by comparing the victim points of segments included in each segment group or may select a predetermined number of victim segments from the entire log area by comparing the victim point of all segments in the log area. When a predetermined number of victim segments are to be selected from the entire log area, each victim point formula for each segment group may be balanced against each other to prevent selecting victim segment in only specific segment group.

According to an embodiment of the present inventive concepts, the file system module 103 may select a predetermined number of victim segments from each section based on the victim points. A section consists of a predetermined number of segments. The section will be described later with reference to FIGS. 5 through 8.

Figure 6:
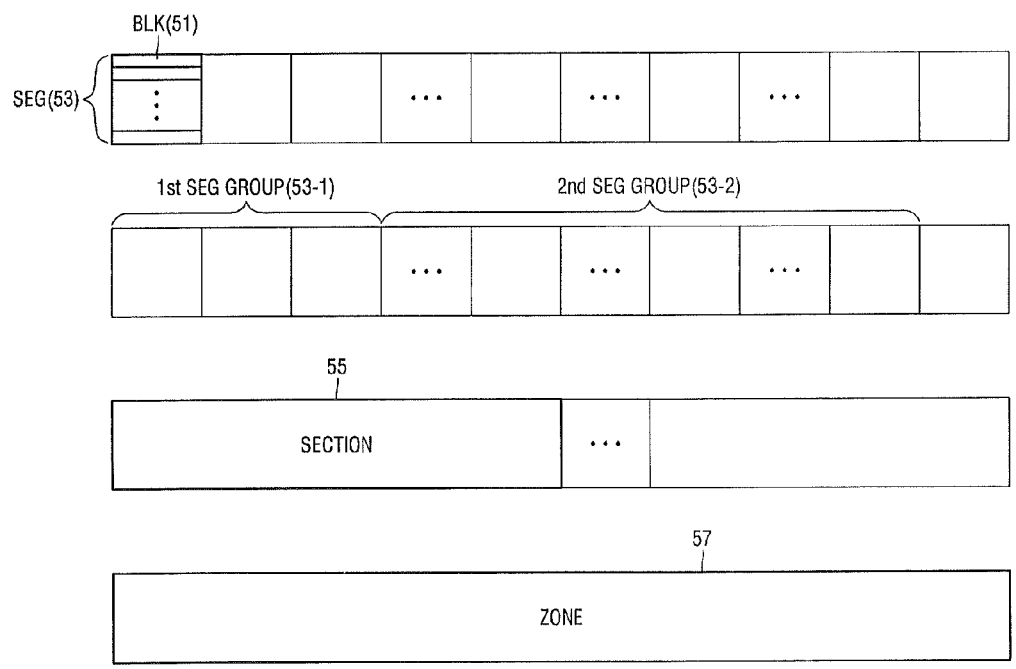
FIGS. 6 through 8 are diagrams illustrating example segment groups of data stored in the storage device of FIG. 1.

The segment groups will be described in more detail later with reference to FIGS. 6 through 8.

Each of the selected victim segments includes not only live blocks which are valid data but also invalid blocks which are no longer valid data since they have been deleted, updated, or the like. The live blocks included in the victim segments may be reconstructed into a new clean segment, and the clean segment may be written back to the storage device 20. The file system module 103 may discover live blocks from blocks included in each victim segment by referring to a bitmap stored in the storage device 20. The bitmap consists of bits respectively corresponding to blocks in the storage device 20, and each bit indicates whether a corresponding block is a live block.

According to an embodiment of the present inventive concepts, the file system module 103 does not directly write back the clean segment. Instead, the file system module 103 may load the live blocks to the WB cache 104, so that the WB cache 104 writes back the clean segment, which consists of the live blocks, to the storage device 20 by flushing the clean segment to the storage device 20.

Specifically, the file system module 103 obtains a file ID of a file to which each of the discovered live blocks belongs and a block offset indicating the position of the live block in the file from metadata stored in the storage device 20.

The file system module 103 checks whether the live blocks are loaded in the WB cache 104 by using the file IDs and the block offsets of the live blocks.

If the live blocks are not loaded in the WB cache 104, the file system module 103 reads the live blocks from the storage device 20 and loads the live blocks to the WB cache 104.

The file system module 103 requests the cache managing module 102 to set dirty flags for the live blocks, so that the cache managing module 102 writes back the live blocks loaded in the WB cache 104 to the storage device 20 through the file system module 103 by flushing the live blocks to the storage device 20.

That is, the cache managing module 102 may control the file system module 103 such that a clean segment including one or more live blocks loaded in the WB cache 104 is written back to the storage device 20.

According to the current embodiment, the file system module 103 does not always read the live blocks in a segment cleaning process. Instead, the file system module 103 reads the live blocks only when the live blocks are not loaded in the WB cache 104 and loads the live blocks to the WB cache 104. Therefore, according to some embodiments of the present inventive concepts, read overhead may be reduced in the segment cleaning process, thus saving I/O bandwidth.

The writing back of the clean segment is performed at a time when the WB cache 104 flushes data set with dirty flags to the storage device 20. Therefore, the time when the clean segment including the live blocks is stored again in the storage device 20 may be different from the time when the live blocks are loaded to the WB cache 104. If the segment cleaning process is of a background type which is performed periodically, the live blocks are not highly likely to be read immediately. Therefore, the above time gap can be accepted.

As mentioned above, the victim segments should be returned to the free area. Therefore, after the writing back of the clean segment, the file system module 103 may designate the victim segments as the free area.

Figure 3:
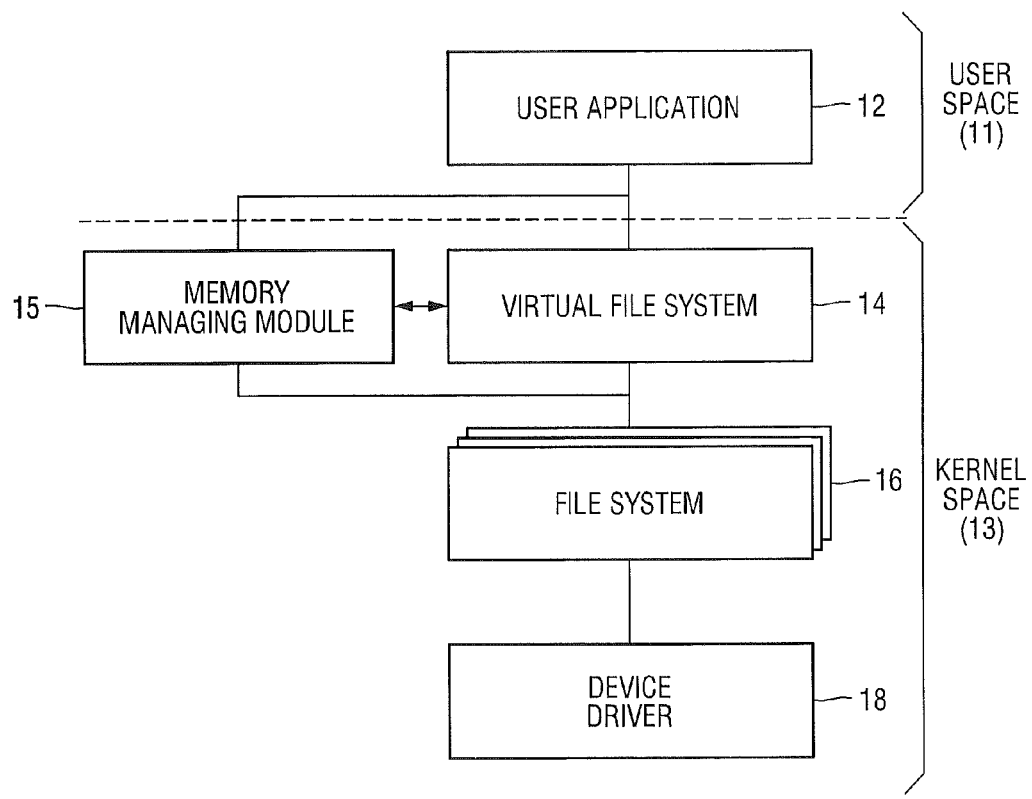
FIG. 3 is a logical module hierarchical diagram of the host shown in FIG. 1.

The host 10 will now be described in more detail with reference to FIG. 3. FIG. 3 is a logical module hierarchical diagram of the host 10.

Referring to FIG. 3, the host 10 includes a user space 11 and a kernel space 13.

The user space 11 is an area in which a user application 12 is executed, and the kernel space 13 is an area dedicated to execution of a kernel. The user space 11 may access the kernel space 13 using a system call provided by the kernel space 13.

The kernel space 13 may include a virtual file system 14 which connects an I/O call of the user space 11 to an appropriate file system 16, a memory managing module 15 which manages a memory of the host 10, one or more file systems 16, and a device driver 18 which provides a hardware control call for controlling the storage device 20. Examples of the file systems 16 may include ext2, ntfs, smbfs, and proc. According to the present inventive concepts, one of the file systems 16 may be an F2FS file system based on a log-structured file system according to various embodiments of the present inventive concepts.

The virtual file system 14 enables the file systems 16 to operate with each other. For a read/write operation on different file systems 16 of different media, the virtual file system 14 enables the use of a standardized system call. For example, a system call, such as open( ) read( ) or write( ) can be used regardless of the type of the file systems 16. That is, the virtual file system 14 is a virtual layer existing between the user space 11 and the file systems 16.

The device driver 18 serves as an interface between hardware and a user application (or operating system). The device driver 18 is a program needed for hardware to operate normally on a certain operating system. The device driver 18 may control the interface 105.

The file system module 103 shown in FIG. 2 may operate as the above-described F2FS file system. In addition, the cache managing module 102 shown in FIG. 2 may be a sub module included in the virtual file system 14 or the memory managing module 15 shown in FIG. 3.

The way the F2FS file system controls the storage device 20 will now be described with reference to FIGS. 4 through 13E.

Figure 4:
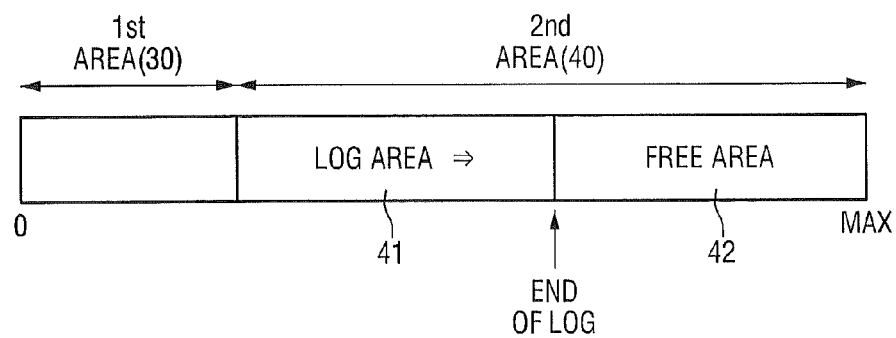
FIG. 4 is a diagram illustrating the configuration of a storage area of a storage device shown in FIG. 1.

The storage device 20 includes a storage medium. Referring to FIG. 4, a storage area of the storage medium may include a first area 30 and a second area 40. The first area 30 is an area that is written in a random access manner, and the second area 40 is an area that is written in a sequential access manner. A sequential access write operation refers to writing data to adjacent addresses which increase gradually, and a random access write operation refers to writing data to designated addresses regardless of whether the addresses are adjacent.

As a segment cleaning process progresses, the log area may be divided into multiple parts. Therefore, the write operation in a sequential access manner may be limited to sequential access writes within one segment. That is, blocks in one segment may be written sequentially.

The F2FS file system may divide the storage device 20 into the first area 30 and the second area 40 when formatting the storage device 20. However, the present inventive concepts are not limited thereto. That is, the F2FS file system may also divide the storage area 20 into the first area 30 and the second area 40 after initially formatting the storage device 20. The first area 30 is an area in which various information managed system-wide is stored. The information may include the number of currently allocated files, the number of valid pages, positions, and the bitmap. The second area 40 is a space in which various directory information, data, and file information actually used by a user are stored.

The storage device 20 may include a buffer utilized for random access. For optimum utilization of the buffer, the first area 30 may be stored in a front part of the storage device 20, and the second area 40 may be stored in a rear part of the storage device 20. Here, the front part precedes the rear part in terms of physical address.

If the storage device 20 is, for example, an SSD, a buffer may be included in the SSD. The buffer may be, for example, a single layer cell (SLC) memory that can be read or written at high speed. Therefore, the buffer can increase the speed of a random access write operation in a limited space. Hence, a reduction in the I/O speed of the storage device 20 due to random access can be prevented using the buffer and by allocating the first area 30 in the front part memory area of the storage device 20.

The second area 40 may consist of a log area 41 and a free area 42. In FIG. 4, the log area 41 is one connected area. However, as victim segments included in the log area 41 are changed to the free area 42 in a segment cleaning process, the log area 41 may be divided into two or more parts.

The log area 41 is a data-written area, and the free area 42 is a data-writable area. Since the second area 40 is written in a sequential access manner, data may be written only to the free area 42 located at "the end of the log area 41." That is, "the end of the log area 41" indicates a position at which data is written. As described above, since the log area 41 can be divided into two or more parts, "the end of the log area 41" may also indicate the free area 42 located between the parts of the log area 41.

When data stored in the log area 41 is modified, the modified data is written not to the position of the stored data in the log area 41 but to the free area 42 located at "the end of the log area 41." Here, the stored data becomes invalid.

As data is newly written or as stored data is modified, the end of the log area 41 is gradually moved closer to the end of the second area 40, thereby reducing the free area 42. Here, segment cleaning is performed. A segment cleaning method according to the present inventive concepts will be described in detail later.

Figure 5:
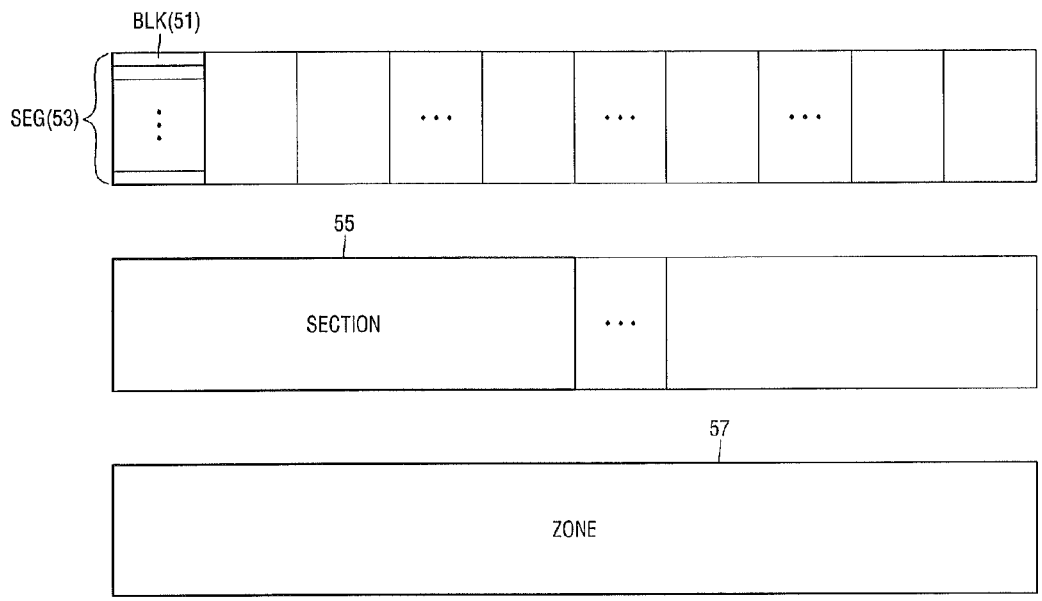
FIG. 5 is a diagram illustrating the configuration of data stored in the storage device of FIG. 1.

FIG. 5 is a diagram illustrating the configuration of data stored in the storage device 20.

A segment 53 may include a plurality of blocks 51, a section 55 may include a plurality of segments 53, and a zone 57 may include a plurality of sections 55. For example, a block 51 may be 4 Kbytes, and a segment 53 including 512 blocks 51 may be 2 Mbytes. This configuration may be determined at a time when the storage device 20 is formatted. However, the present inventive concepts are not limited thereto. The size of each section 55 and the size of each zone 57 can be modified when the storage device 20 is formatted. The F2FS file system may read or write all data on a 4 Kbyte page-by-4 Kbyte page basis. That is, one page may be stored in each block 51, and a plurality of pages may be stored in each segment 53.

A plurality of segments 53 may form one segment group. For example, referring to FIG. 6, the storage area of the storage device 20 may include a first segment group 53-1 and a second segment group 53-2. As described earlier, a victim point calculation formula may correspond to each segment group. For example, a first victim point calculation formula may correspond to the first segment group 53-1, and a second victim point calculation formula may correspond to the second segment group 53-2. According to various embodiments of the present inventive concepts, victim points used to select victim segments are calculated using a different method for each segment group to which each segment belongs. Thus, whether each segment is appropriate as a victim segment can be evaluated using a different method according to characteristics of the segment.

According to an embodiment, each segment group may consist of segments located in a corresponding address area. The address may be a physical address or a logical address. For example, the first segment group 53-1 may consist of segments located in a first address area, and the second segment group 53-2 may consist of segments located in a second address area different from the first address area.

Figure 7:
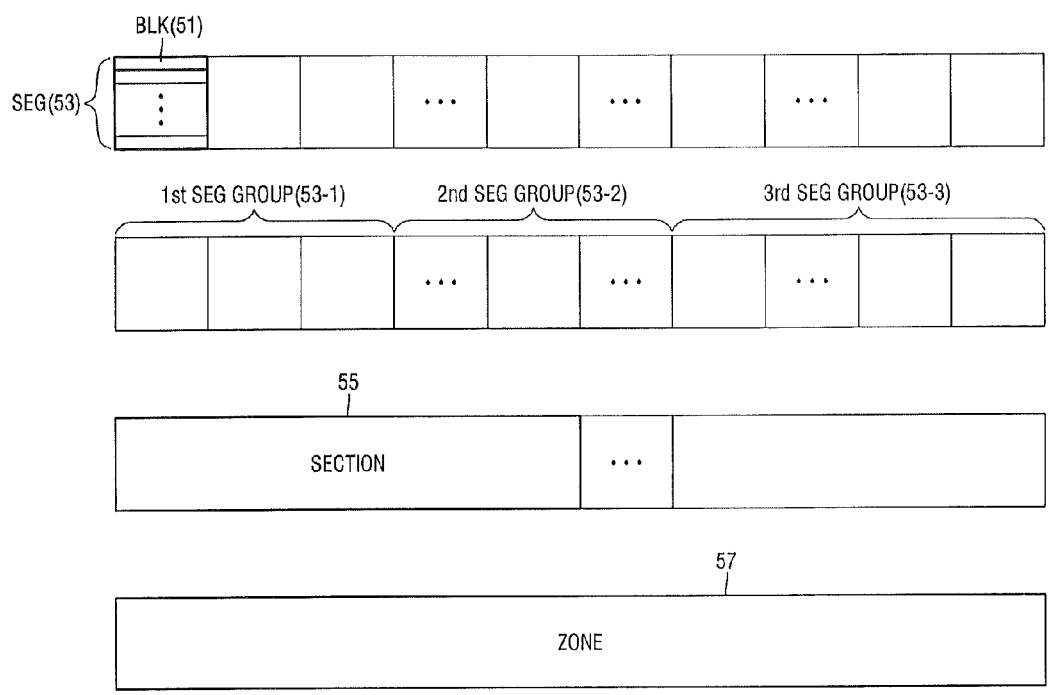

Referring to FIG. 7, the storage area of the storage device 20 may include a third segment group 53-3 in addition to the first segment group 53-1 and the second segment group 53-2. The first through third segment groups 53-1 through 53-3 may correspond to different victim point calculation formulas. Alternatively, the two segment groups 53-2 and 53-3 excluding the first segment group 53-1 may use the same victim point calculation formula.

Figure 8:
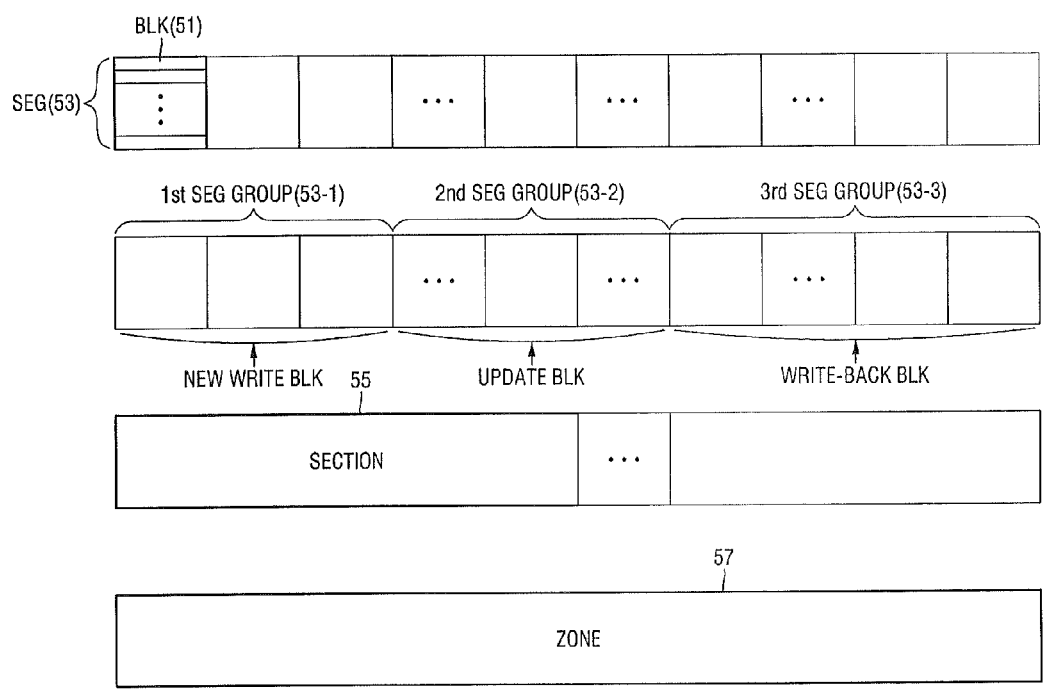

Referring to FIG. 8, the first segment group 53-1 may consist of segments which include newly written data. The second segment group 53-3 may consist of segments which include data written when the data included in the segments of the first segment group 53-1 or the third segment group 53-3 is updated. The third segment group 53-3 may consist of clean segments written back as a result of segment cleaning.

The first segment group 53-1 may correspond to a first victim point calculation formula. The first victim point calculation formula may use the proportion u of live blocks relative to the total number of blocks included in a segment and an age calculated using a modification time of a last modified one of the blocks included in the segment. The first victim point calculation formula may produce a greater victim point as the proportion u decreases and as the age increases. The F2FS file system may select a predetermined number of victim points in order of size (from largest from smallest). Since the first segment group 53-1 includes newly written data, the degree of utilization of blocks and the probability that the blocks will be updated are variable. Therefore, the F2FS file system may calculate victim points for data included in the first segment group 53-1 in view of both the degree of utilization and the age.

That is, the first victim point calculation formula may be defined by $$\text{victim point} = \frac{(1-u)*\text{age}}{(1+u)}.$$

The second segment group 53-2 includes data that has been updated. That is, the second segment group 53-2 is a segment group including data that is highly likely to be updated. Since updated data is highly likely to be updated again, victim points may be calculated using only the proportion u of live blocks relative to the total number of blocks included in each segment of the second segment group 53-2 in order to select victim segments from the second segment group 53-2. On the other hand, the third segment group 53-3 includes data written back as a result of segment cleaning. That is, the third segment group 53-3 is a segment group including data that is hardly likely to be updated. Since the third segment group 53-3 includes data hardly likely to be updated, the F2FS file system may calculate victim points for the data in the third segment group 53-3 using only the proportion u of live blocks relative to the total number of blocks included in each segment of the third segment group 53-3. That is, the second and third segment groups 53-2 and 53-3 may correspond to a second victim point calculation formula that uses a value obtained by dividing the number of live blocks in a segment by the total number of blocks included in the segment. Since the second victim point calculation formula imposes a small calculation load, the F2FS file system can quickly calculate victim points for the second and third segment groups 53-2 and 53-3.

Figure 9:
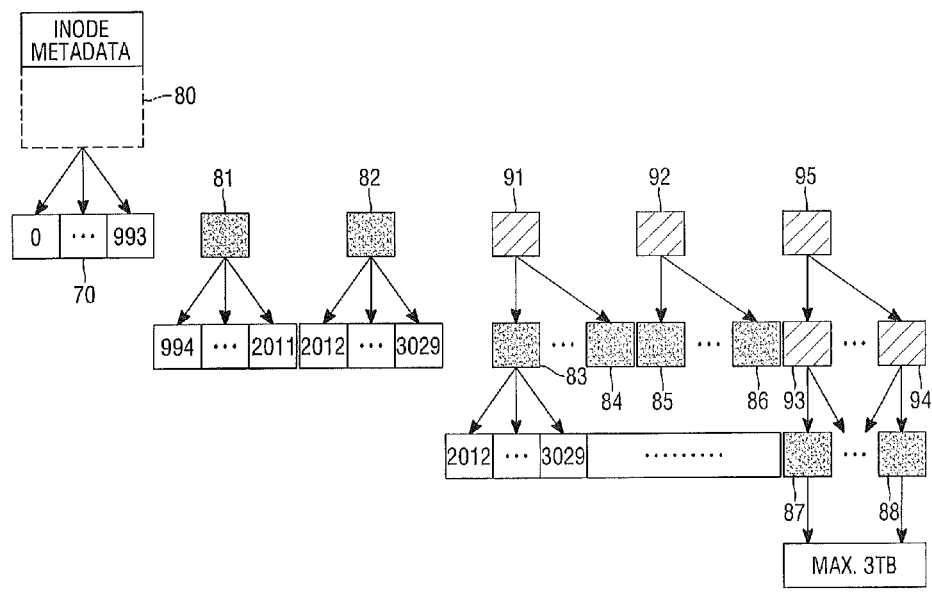
FIG. 9 is a diagram illustrating the structure of a file stored in the storage device of FIG. 1.

A file stored in the storage device 20 may have an indexing structure as shown in FIG. 9. One file may include a plurality of data and a plurality of nodes associated with the data. Data blocks 70 are where the data are stored, and node blocks 80, 81 through 88 and 91 through 95 are where the nodes are stored.

The node blocks 80, 81 through 88 and 91 through 95 may include direct node blocks 81 through 88, indirect node blocks 91 through 95, and an Mode block 80. In the F2FS file system, one file has one Mode block 80.

Bits that constitute a bitmap 640 may respectively indicate whether the data blocks 70 as well as the node blocks 80, 81 through 88 and 91 through 95 are live blocks.

Each of the direct node blocks 81 through 88 includes an ID of the Mode block 80 and a number of data pointers (which directly indicate the data blocks 70) equal to the number of the data blocks 70 which are child blocks of the direct node block. Each of the direct node blocks 81 through 88 further stores information about where each data block 70 comes in the file corresponding to the Mode block 80, that is, offset information of each data block 70.

Each of the indirect node blocks 91 through 95 includes pointers which indicate direct node blocks or other indirect node blocks. The indirect node blocks 91 through 95 may include, for example, first indirect node blocks 91 through 94 and a second indirect node block 95. The first indirect node blocks 91 through 94 include first node pointers which indicate the direct node blocks 83 through 88. The second indirect node block 95 includes second node pointers which indicate the first indirect node blocks 93 and 94.

The inode block 80 may include at least one of data pointers, first node pointers which indicate the direct node blocks 81 and 82, second node pointers which indicate the first indirect node blocks 91 and 92, and a third node pointer which indicates the second indirect node block 95. One file may have a maximum of 3 Tbytes, and such a high-volume file may have the following indexing structure. For example, the inode block 80 may have 994 data pointers, and the 994 data pointers may indicate 994 data blocks 70, respectively. In addition, the Mode block 80 may have two first node pointers, and the two first node pointers may indicate the two direct node blocks 81 and 82, respectively. The Mode block 80 may have two second node pointers, and the two second node pointers may indicate the two first indirect node blocks 91 and 92, respectively. The Mode bock 80 may have one third node pointer, and the third node pointer may indicate the second indirect node block 95.

FIGS. 10A through 10D illustrate in detail the storage area of the storage device 20 configured by the F2FS file system according to some embodiments of the present inventive concepts.

Figure 10A:
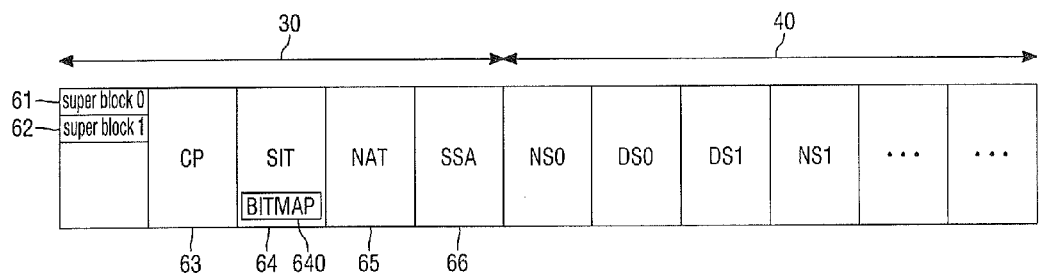
FIGS. 10A through 10D are diagrams illustrating the arrangement of blocks stored in the storage device of FIG. 1.

According to an embodiment of the present inventive concepts, the F2FS file system may configure the storage area of the storage device 20 to include a random accessible first area 30 and a sequentially accessible second area 40, as shown in FIG. 10A.

Specifically, the first area 30 may include super blocks 61 and 62, a checkpoint (CP) area 63, a segment information table (SIT) 64, a node address table (NAT) 65, and a segment summary area (SSA) 66.

In the super blocks 61 and 62, default information of a file system 16 is stored. For example, the size of the blocks 51, the number of the blocks 51, and a status plug (clean, stable, active, logging, or unknown) of the file system 16 may be stored. As shown in the drawing, two super blocks 61 and 62 may be provided, and the same content may be stored in the two super blocks 61 and 62. Therefore, when a problem occurs in any of the two super blocks 61 and 62, the other can be used.

The CP area 63 stores a checkpoint. The CP is a logical break point, and the status until the break point is completely preserved. When an accident (e.g., a shutdown) occurs during the operation of a computing system, the file system 16 can recover data using the preserved CP. The CP may be generated periodically, at a Umount time, or at a system shutdown time. However, the present inventive concepts are not limited thereto.

Figure 11:
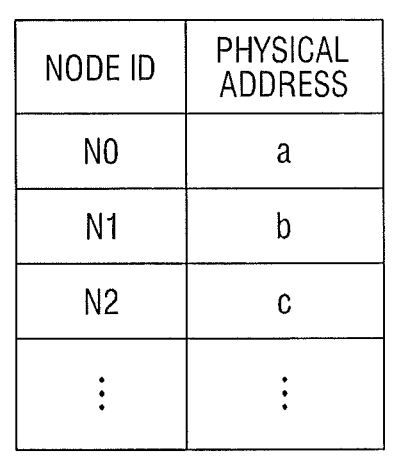

Referring to FIG. 11, the NAT 65 may include a plurality of node IDs respectively corresponding to nodes and a plurality of physical addresses respectively corresponding to the node IDs. For example, a node block corresponding to node ID N0 may correspond to physical address a, a node block corresponding to node ID N1 may correspond to physical address b, and a node block corresponding to node ID N2 may correspond to physical address c. All nodes (an Mode, direct nodes, indirect nodes, etc.) have unique node IDs. In other words, all nodes (an Mode, direct nodes, indirect nodes, etc.) may be allocated unique node IDs from the NAT 65. The NAT 65 may store a node ID of an Mode, node IDs of direct nodes, node IDs of indirect nodes, and the like. A physical address corresponding to each node ID can be updated.

The SIT 64 includes the number of live blocks included in each segment and the bitmap 640 indicating whether each block is a live block. Each bit of the bitmap 640 indicates whether a corresponding block is a live block. The SIT 64 can be used in a segment cleaning operation. That is, the file system module 103 can discover live blocks included in each victim segment by referring to the bitmap 640 included in the SIT 64.

The SIT 64 can be referred to in order to select victim segments. That is, a victim segment may be selected based on the number or proportion of live blocks relative to the total number of blocks included in a segment.

The SSA 66 describes an ID of a parent node to which each block included in each segment of the second area 40 belongs.

Each of the direct node blocks 81 through 88 has address information of the data blocks 70 in order to access the data blocks 70 which are its child blocks. On the other hand, each of the indirect node blocks 91 through 95 has an ID list of its child nodes in order to access the child node blocks. Once an ID of a certain node block is identified, a physical address thereof can be identified with reference to the NAT 65.

In a log-structured file system, data written to a data block is not overwritten at its original storage position as a different value. Instead, a new data block having updated data is written at the end of a log. In this case, a parent node block of the data block should modify the existing address of the data block. Therefore, to overwrite a data block or write back the data block at the end of the log in a segment cleaning process, information about a parent node of the data block is required. However, it is difficult for each data block or each node block to identify information about its parent node. Therefore, the F2FS file system according to various embodiments of the present inventive concepts includes the SSA 66 which contains an index used by each data block or each node block to identify an ID of its parent node block. Based on the SSA 66, the ID of the parent node block of each data block or each node block can be identified easily.

One segment summary block has information about one segment in the second area 40. In addition, the segment summary block consists of a plurality of pieces of summary information, and one piece of summary information corresponds to one data block or one node block.

Referring to FIG. 10A, the second area 40 may include data segments DS0 and DS1 and node segments NS0 and NS1 separate from the data segments DS0 and DS1. A plurality of data may be stored in the data segments DS0 and DS1, and a plurality of nodes may be stored in the node segments NS0 and NS1. If data and nodes are stored in different regions, segments can be managed efficiently, and the data can be read more effectively in a shorter time.

In the drawing, the first area 30 includes the super blocks 61 and 62, the CP area 63, the SIT 64, the NAT 65, and the SSA 66 arranged sequentially. However, the present inventive concepts are not limited thereto. For example, the position of the SIT 64 and the position of the NAT 65 can be reversed, and the position of the NAT 65 and the position of the SSA 66 can be reversed.

Figure 10B:
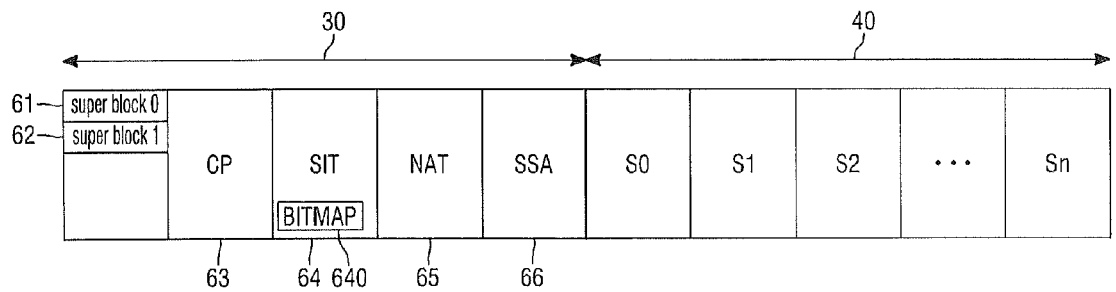

The F2FS file system can also configure the storage area of the storage device 20 as shown in FIG. 10B. Referring to FIG. 10B, in a storage device of a computing system according to another embodiment of the present inventive concepts, the second area 40 may include a plurality of segments S1 through Sn which are separate from each other, where n is a natural number. While data segments and node segments are managed separately in FIG. 10A, data and nodes can be stored together in each of the segments S1 through Sn in FIG. 10B.

Figure 10C:
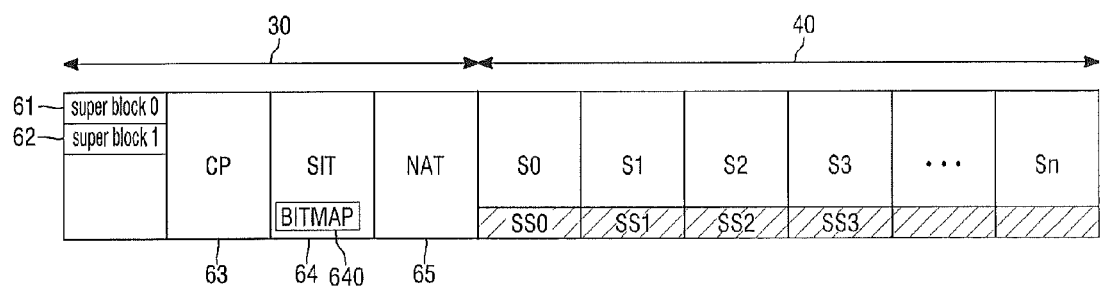

The F2FS file system can also configure the storage area of the storage device 20 as shown in FIG. 10C. Referring to FIG. 10C, the first area 30 does not include the SSA 66 (see FIG. 10A). That is, the first area 30 includes the super blocks 61 and 62, the CP area 62, the SIT 64, and the NAT 65. Therefore, segment summary information may be stored in the second area 40. Specifically, the second area 40 includes a plurality of segments S0 through Sn, and each of the segments S0 through Sn is divided into a plurality of blocks. The segment summary information may be stored in at least one block SS0 through SSn of each of the segments S0 through Sn.

Figure 10D:
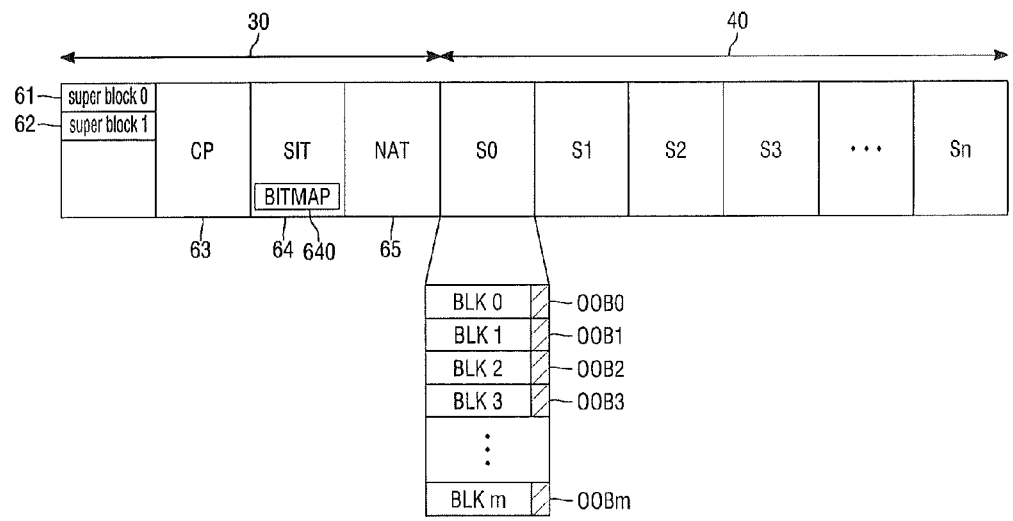

The F2FS file system can also configure the storage area of the storage device 20 as shown in FIG. 10D. Referring to FIG. 10D, as in FIG. 10C, the first area 30 does not include the SSA 66 (see FIG. 10A). That is, the first area 30 includes the super blocks 61 and 62, the CP area 62, the SIT 64, and the NAT 65. Therefore, the segment summary information may be stored in the second area 40. The second area 40 includes a plurality of segments S0 through Sn. Each of the segments S0 through Sn is divided into a plurality of blocks BLK0 through BLKm, and the blocks BLK0 through BLKm respectively include out of band (OOB) areas OOB1 through OOBm, where m is a natural number. The segment summary information may be stored in the OOB areas OOB1 through OOBm.

Figure 12A:
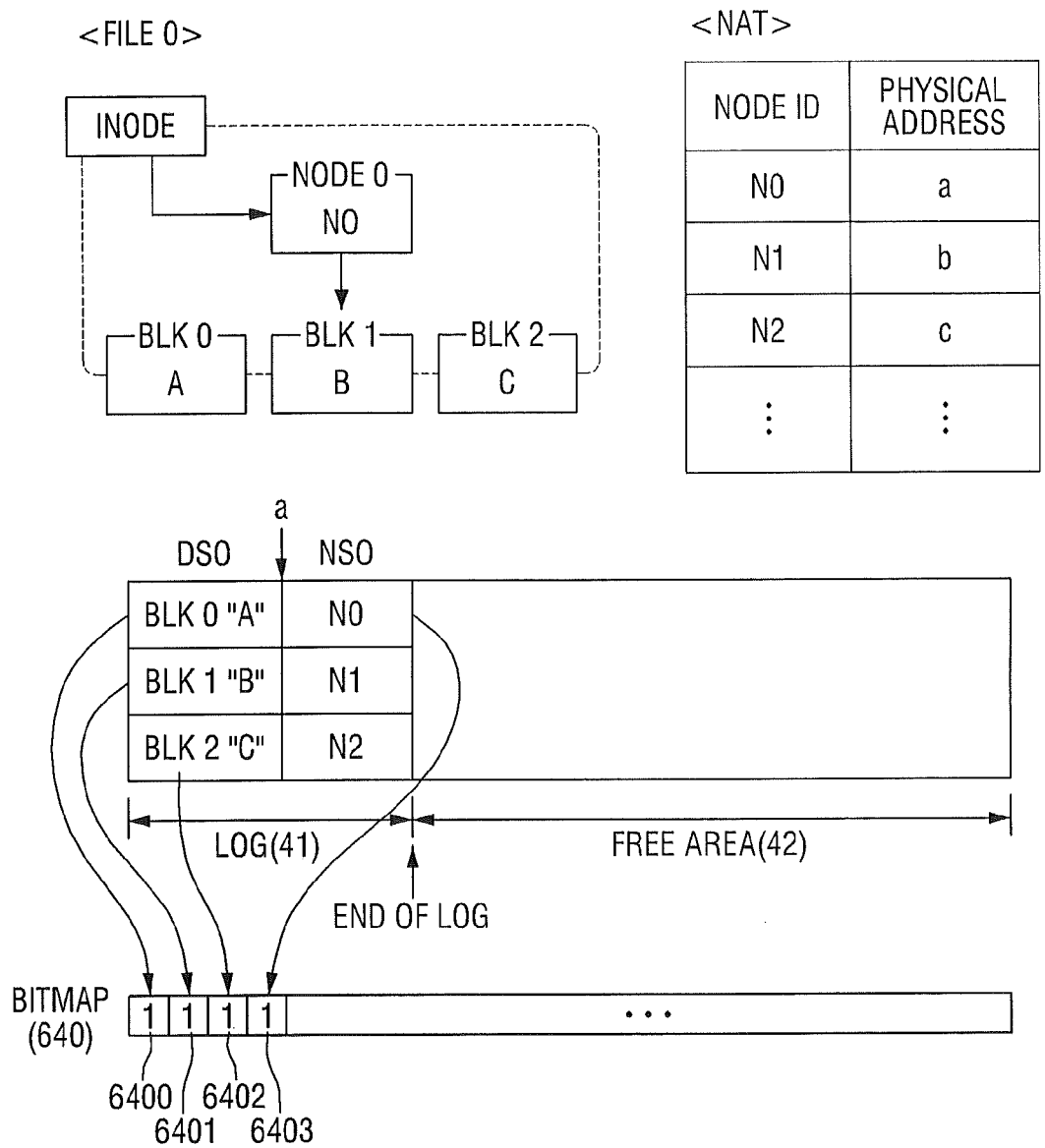
FIGS. 12A and 12B are conceptual diagrams illustrating a process of updating data stored in the storage device of FIG. 1 and updating a bitmap accordingly.
Figure 12B:
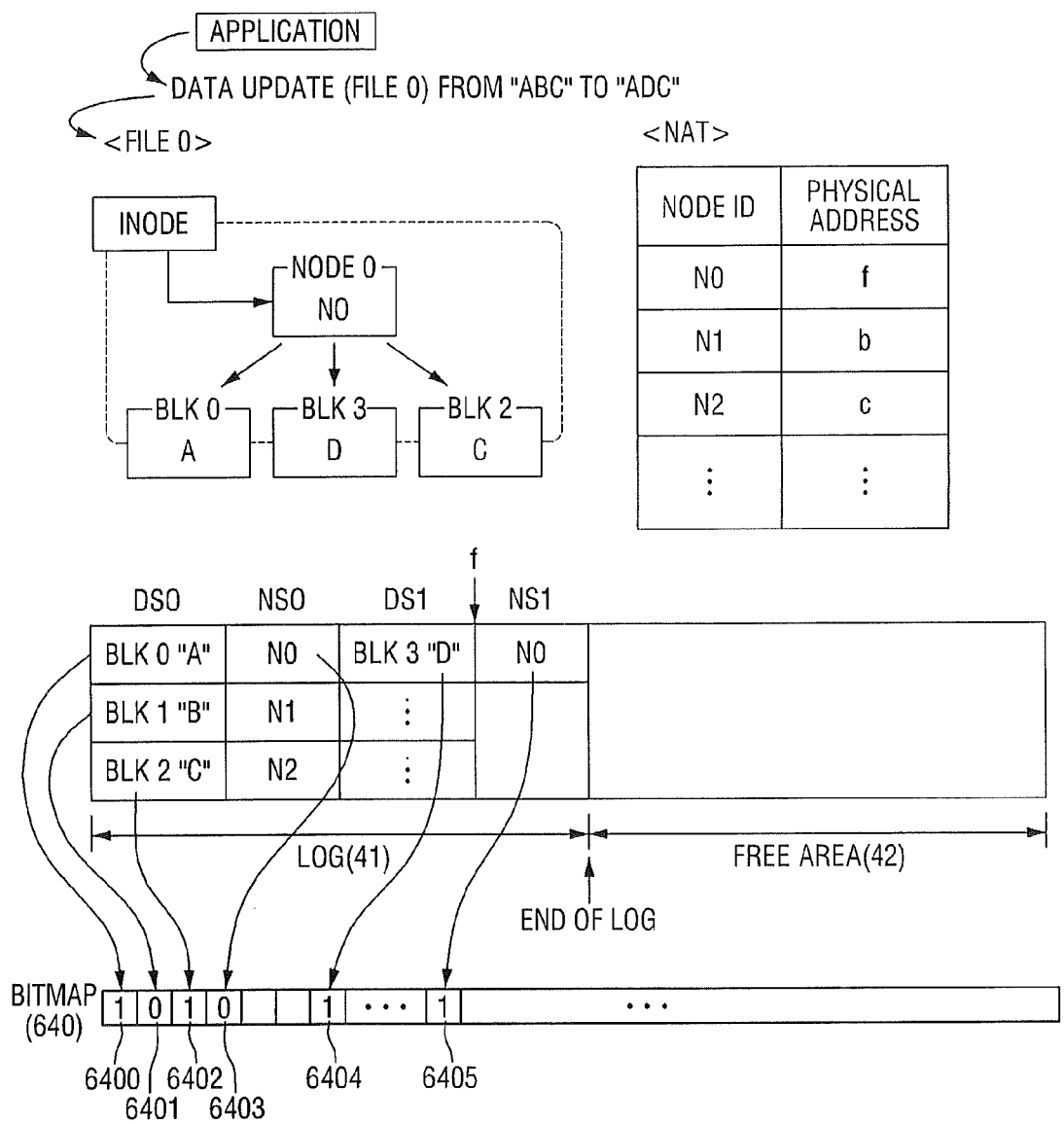

A data update operation of the F2FS file system will now be described with reference to FIGS. 12A and 12B. FIGS. 12A and 12B are conceptual diagrams illustrating a process of updating data stored in the storage device 20 of FIG. 1 and updating the bitmap 640 accordingly. FIG. 12A illustrates data "ABC" stored in file 0 before being updated, and FIG. 12B illustrates data "ADC" stored in file 0 in response to a command from an application to update the data "ABC" to "ADC." The F2FS file system configures file 0 to include nodes and data blocks as shown in FIG. 9. For ease of description, it is assumed in FIGS. 12A and 12B that file 0 is configured such that an inode indicates one direct node N0 and that the direct node N0 indicates three data blocks.

Referring to FIG. 12A, a first data segment DS0 in the log area 41 includes first through third data blocks BLK 0 through BLK 2. It is assumed that the first data block BLK 0 stores 'A,' that the second data block BLK 1 stores "B," and that the third data block BLK 2 stores "C." Unlike the illustration in FIG. 12A, the first data segment DS0 can include more data blocks in addition to the first through third data blocks BLK 0 through BLK 2.

A first node segment NS0 in the log area 41 may include the direct node block N0. The direct node block N0 may store at least a node ID (N0) and physical address information of the first through third data blocks BLK 0 through BLK 2. As shown in FIG. 12A, a physical address of the direct node block N0 is "a."

Referring to FIG. 12A, the bitmap 640 includes a bit 6400 corresponding to the first data block BLK 0, a bit 6401 corresponding to the second data block BLK 1, a bit 6402 corresponding to the third data block BLK 2, and a bit 6403 corresponding to the direct node N0. All of the first through third data blocks BLK 0 through BLK 2 are live blocks that store valid data. Thus, the bits 6400 through 6402 of the bitmap 640 which respectively correspond to the first through third data blocks BLK 0 through BLK 2 may be set to a value (e.g., "1," the same below) indicating a live block. In addition, since the direct node block N0 is a live block that stores valid data, the bit 6403 of the bitmap 640 which corresponds to the direct node block N0 may be set to the value indicating a live block.

Meanwhile, a NAT may store N0 which is the ID of the direct node block and "a" which is the physical address of N0.

File 0 having the updated data may be configured as shown in FIG. 12B.

Referring to FIG. 12B, since the application has instructed to update "ABC" of file 0 to "ADC," the second data block BLK 1 which stores "B" should be updated. However, the F2FS file system does not update "B" stored in the second data block BLK 1 to "D." Instead, the F2FS file system stores a new fourth data block BLK 3, which stores "D," in a second data segment DS1 located at the end of the log area 41. That is, the updated file 0 consists of the first data block BLK 0, the fourth data block BLK 3, and the third data block BLK 2.

Accordingly, the physical address information of the second data block BLK 1 in the direct node block N0 should be updated to physical address information of the fourth data block BLK 3. However, the F2FS file system does not update the existing physical address information of the child blocks of the direct node block N0. Instead, the F2FS file system generates a new node block having the physical address information of the first data block BLK 0, the fourth data block BLK 3, and the third data block BLK 2 as address information of its child blocks. Here, the new node block has the same node ID (i.e., N0) as the direct node block N0. The new node block may be included in a second node segment NS1 located at the end of the log area 41.

Since the fourth data block BLK 3 and the new node block N0 included in the second node segment NS1 are newly written, a bit 6404 corresponding to the fourth data block BLK 3 and a bit 6405 corresponding to the newly written node block N0 included in the second node segment NS1 are also set to the value indicating a live block.

On the other hand, the second data block BLK 1 and the node block N0 included in the first node segment NS0 are no longer valid data. Therefore, the bit 6401 corresponding to the second data block BLK 1 and the bit 6403 corresponding to the node block N0 in the first node segment NS0 are set to a value (e.g., "0," the same below) indicating an invalid block.

The physical address of the node block N0 is changed from "a" to "f." According to a conventional log-structured file system, if the new node block is generated as described above, the physical address information of the node block N0 included in an indirect node which is a parent node of the node block N0 should also be modified. In addition, since the indirect node will also be written to a new node block, a node block update operation may continuously propagate to the inode as a parent node block. This is called a "wandering tree" problem. Since the wandering tree problem may cause too many nodes to be newly written unnecessarily, it can reduce write efficiency achieved by sequential access writes.

On the other hand, when a direct node block has to be newly written due to a data block update, the F2FS file system according to various embodiments of the present inventive concepts simply modifies a physical address (from "a" to "f") corresponding to the direct node in the NAT 65. Thus, the node block update operation does not propagate to above the direct node. Consequently, the F2FS file system solves the wandering tree problem that occurs in the conventional log-structured file system.

A segment cleaning process of the F2FS file system according to various embodiments of the present inventive concepts will now be described with reference to FIGS. 13A through 13E.

Figure 13A:
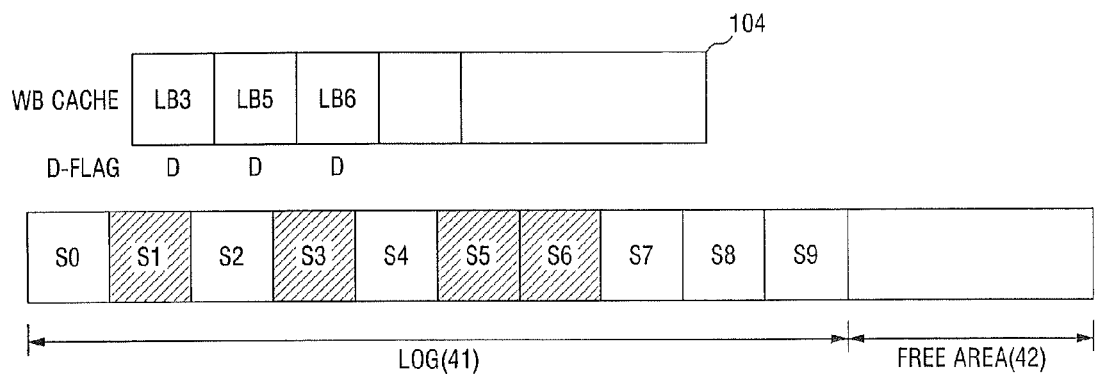
FIGS. 13A through 13E are conceptual diagrams illustrating a process of performing segment cleaning on data stored in the storage device of FIG. 1.

Referring to FIG. 13A, the log area 41 includes a plurality of segments S0 through S9. Since the free area 42 is narrower than a predetermined width, a segment cleaning operation is initiated. First, victim segments are selected from the segments S0 through S9 included in the log area 41.

The selecting of the victim segments includes calculating a victim point by applying a victim point calculation formula corresponding to a segment group, to which the segments S0 through S9 belong, to each of the segments S0 through S9 and selecting the victim segments based on the victim points. In FIG. 13A, the segments S1, S3, S5 and S6 are selected as victim segments.

In FIG. 13A, the WB cache 104 is also illustrated. Live blocks LB3, LB5 and LB6 included in the segments S3, S5 and S6 are already loaded in the WB cache 104. In addition, a dirty bit corresponding to data stored in each entry of the WB cache 104 is illustrated. When performing a flush operation, the WB cache 104 writes back data loaded in entries set with dirty bits to the storage device 20.

Next, the F2FS file system checks whether live blocks included in the victim segments are already loaded in the WB cache 104. The live blocks included in each of the victim segments can be identified by referring to the bitmap 640 included in the SIT 64.

In addition, the WB cache 104 manages a file ID of a file, to which each data block stored in each entry belongs, and offset information indicating the position of the data block in the file. Therefore, using the file IDs and offset information of the live blocks, the F2FS file system can check whether the live blocks are loaded in the WB cache 104 with the memory managing module 15, which manages the WB cache 104, or the virtual file system 14. The F2FS file system may retrieve a parent node ID of each live block from the SSA 66, obtain a physical address corresponding to the parent node ID from the NAT 65, and obtain an ID of a file to which the live block belongs and offset information of the live block from a parent node block stored at the physical address.

Figure 13B:
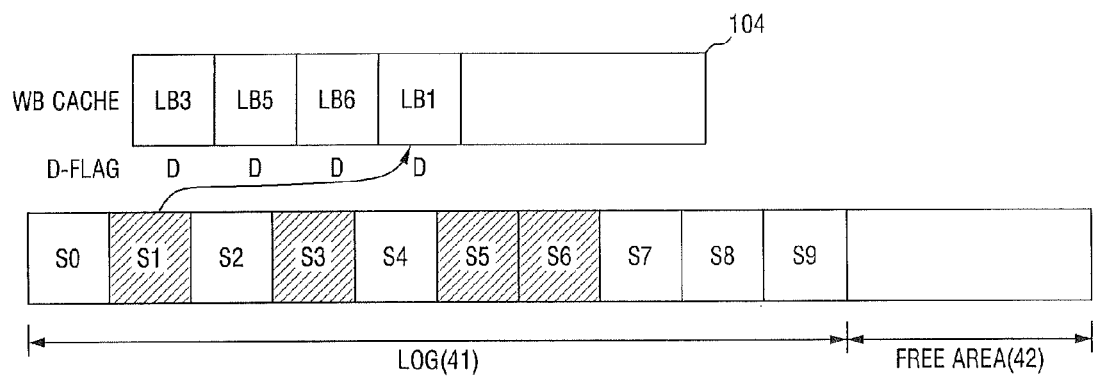

Referring to FIG. 13A, of live blocks included in the victim segments S1, S3, S5 and S6, the live blocks LB3, LB5 and LB6 of the segments S3, S5 and S6 are already loaded in the WB cache 104. However, a live block LB1 of the segment S0 is not yet loaded in the WB cache 104. Therefore, the F2FS file system requests the memory managing module 15, which manages the WB cache 104, or the virtual file system 14 to read LB1 from the storage device 20 and load the read LB1 to the WB cache 104. This process is illustrated in FIG. 13B.

Next, the F2FS file system requests the memory managing module 15, which manages the WB cache 104, or the virtual file system 14 to set dirty flags for the live blocks loaded in advance or newly.

Figure 13C:
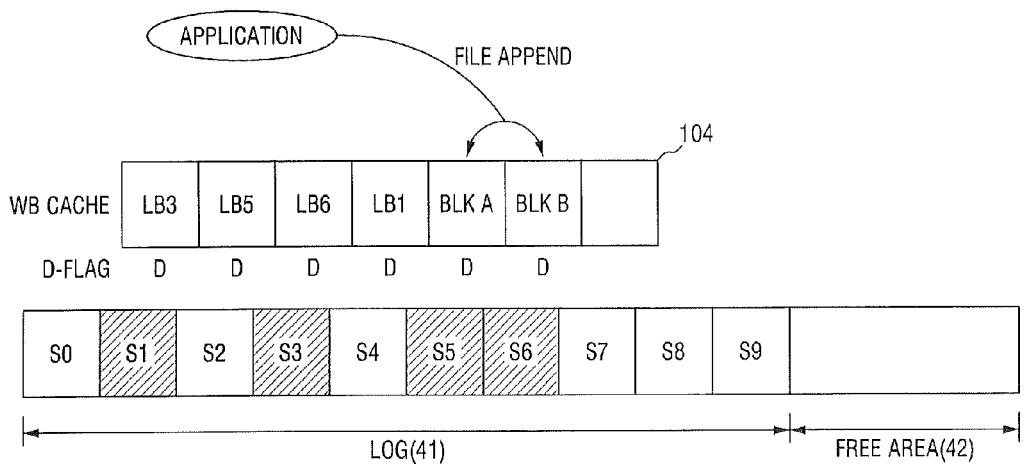

As mentioned earlier, the WB cache 104 writes back all data stored in entries set with dirty flags to the storage device 20 when performing a flush operation. Therefore, the time when the live blocks included in the victim segments are loaded in the WB cache 104 may be somewhat different from the time when they are written back. Referring to FIG. 13C, before the write-back operation, an application may issue a command to append data to the file. In this case, the memory managing module 15, which manages the WB cache 104, or the virtual file system 14 may not directly append blocks BLK A and BLK B, which should be appended in response to the file append command, to the storage device 20 but may input the blocks BLK A and BLK B to the WB cache 104. Referring to FIG. 13C, since the blocks BLK A and BLK B are not stored in the storage device 20, they are set with dirty bits.

Figure 13D:
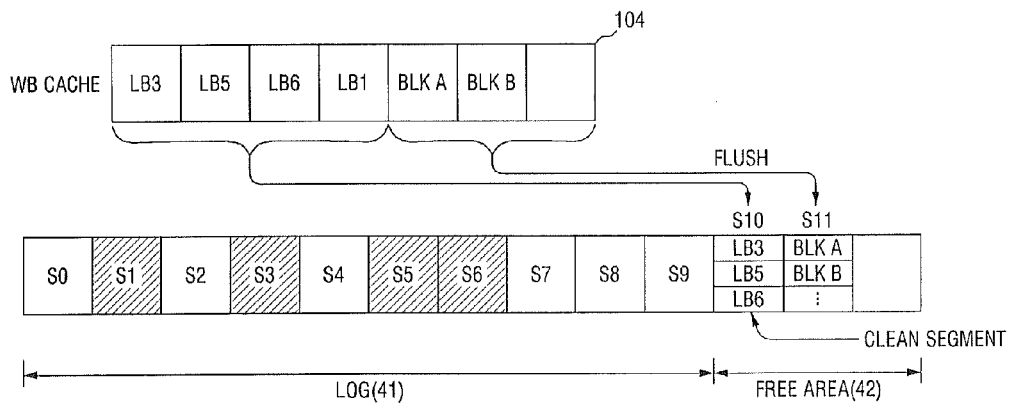

Referring to FIG. 13D, when it is time for the WB cache 104 to perform a flush operation, the memory managing module 15, which manages the WB cache 104, or the virtual file system 14 writes back data set with dirty bits to the storage device 20 from among data loaded in the WB cache 104.

The memory managing module 15, which manages the WB cache 104, or the virtual file system 14 writes back a clean segment S10, which is composed only of the live blocks, and a segment S11, which includes the blocks BLK A and BLK B that should be appended in response to the data append command, at the end of the log area 41. Unlike the illustration in FIG. 13D, if more blocks can be included in one segment, not only the live blocks but also the blocks BLK A and BLK B may be included in the segment S10.

The memory managing module 15, which manages the WB cache 104, or the virtual file system 14 may update the bitmap 640 to reflect the writing of the clean segment S10 and the segment S11. That is, bits corresponding to the live blocks included in the clean segment S10 and bits corresponding to the blocks BLK A and BLK B included in the segment S11 may be set to the value indicating a live block.

As a result of the write-back operation, the victim segments S1, S3, S5 and S6 may be returned to the free area 42. Accordingly, the memory managing module 15, which manages the WB cache 104, or the virtual file system 14 may update the bitmap 640 to reflect the returning of the victim segments S1, S3, S5 and S6 returned to the free area 42. That is, all bits corresponding respectively to all blocks included in the victim segments S1, S3, S5 and S6 may be set to the value indicating an invalid block.

The memory managing module 15, which manages the WB cache 104, or the virtual file system 14 groups data to be written back according to file and writes back the data accordingly. Therefore, data included in the same file can be written back adjacent to each other.

If FIG. 13A is compared with FIG. 13D, four victim segments were included in the log area 41 before the segment cleaning process according to the present inventive concepts. However, live blocks included in the four victim segments were incorporated into one clean segment S10 as a result of the segment cleaning process. Therefore, three segments can be returned to the free area 42.

Figure 13E:
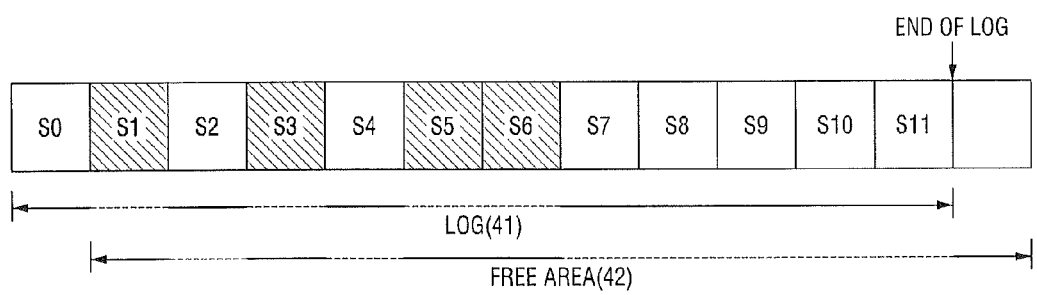

The log area 41 was one connected area before the segment cleaning process according to the present inventive concepts. However, the victim segments included in the log area 41 were returned to the free area 42 as a result of the segment cleaning process. Thus, the log area 41 consists of two or more separate areas as shown in FIG. 13E. In a state where the log area 41 and the free area 42 are configured as shown in FIG. 13E, if an additional segment should be recorded, it is recorded in the free area 42 at the end of the log area 41. Once the end of the storage area of the storage device 20 is reached, the free area 42 is searched for again from the beginning of the second area 40. Since the segments S1, S3, S5 and S6 were returned to the free area 42, new data or node blocks can be written to the segments S1, S3, S5 and S5 in a sequential access manner.

Specific systems to which a computing system according to some embodiments of the present inventive concepts can be applied will now be described. The systems described below are merely examples, and the present inventive concepts are not limited to these examples.

Figure 14:
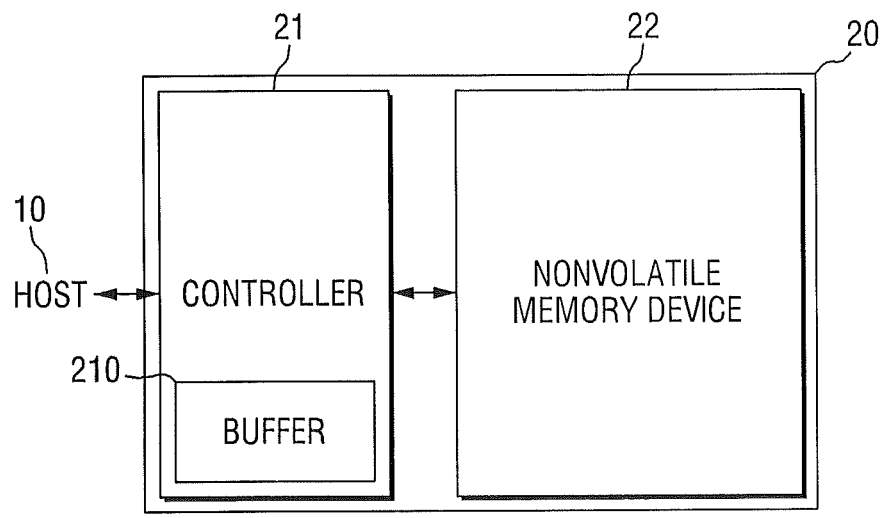
FIGS. 14 through 16 are block diagrams of other specific examples of the computing system according to some embodiments of the present inventive concepts.
Figure 15:
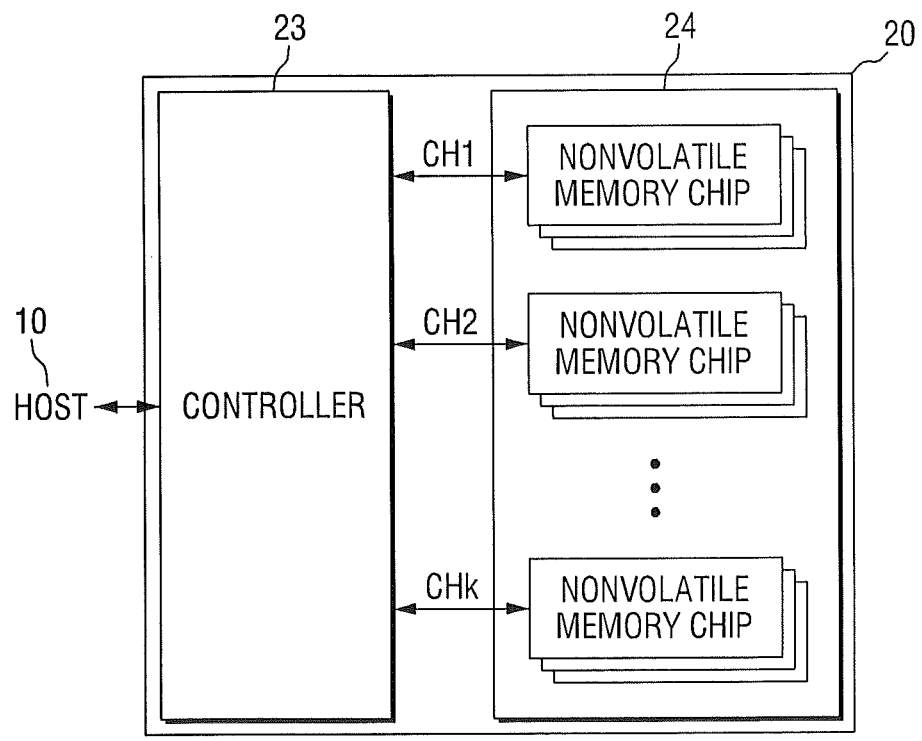
Figure 16:
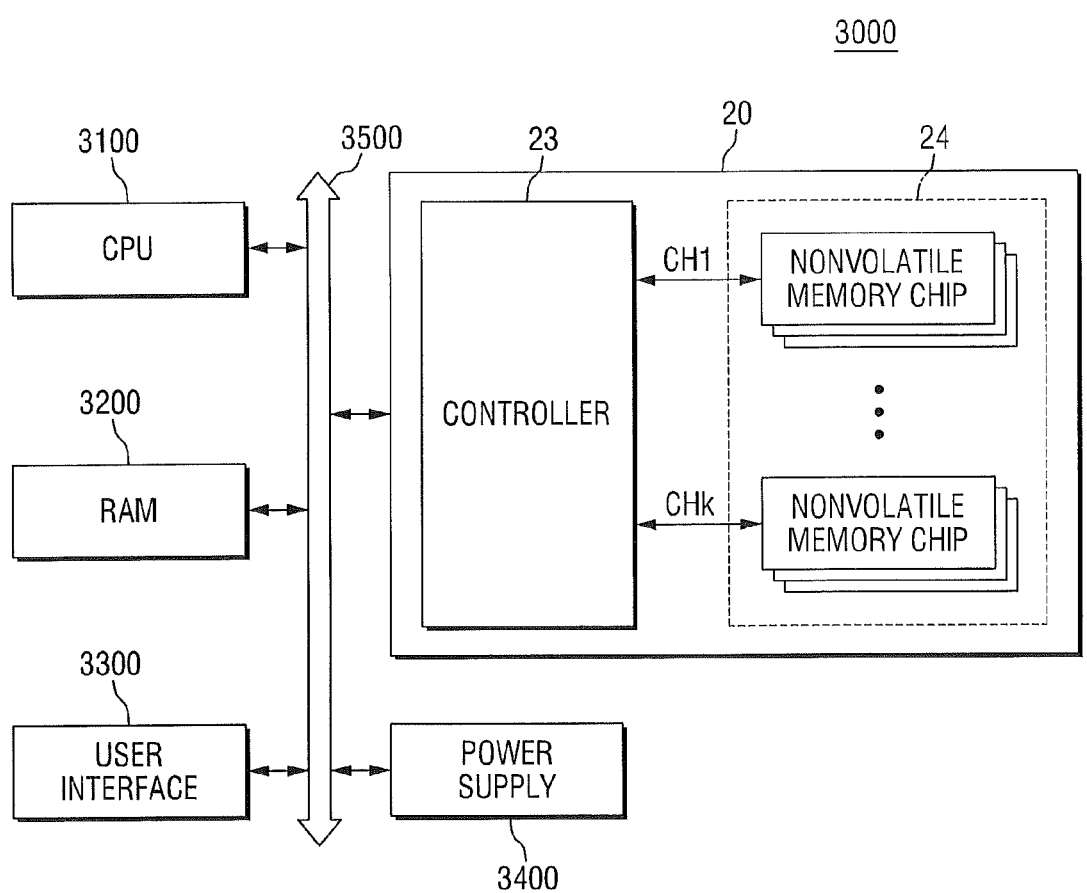

FIGS. 14 through 16 are block diagrams of other specific examples of the computing system according to some embodiments of the present inventive concepts.

Referring to FIG. 14, a storage device 20 may include a nonvolatile memory device 22 and a controller 21.

The nonvolatile memory device 22 is controlled by the controller 21 to read or write data. A storage area of the nonvolatile memory device 22 consists of a first area 30 which is written in a random access manner and a second area 40 to which a plurality of segments, each including a plurality of blocks, are written in a sequential access manner. The second area 40 consists of a log area in which the segments are stored and a free area in which segments can be stored. Metadata about data stored in the second area 40 is stored in the first area 30. The metadata includes a bitmap 640 indicating whether each block is a live block. The bitmap 640 is data that is referred to in order to discover live blocks in each victim segment in a segment cleaning process.

Super blocks 61 and 62, a CP area 63, a SIT 64, and a NAT 65 described above may be stored as the metadata in the first area 30 of the nonvolatile memory device 22. The bitmap 640 is included in the SIT 64.

Each bit of the bitmap 640 corresponds to one block.

The controller 21 is connected to a host 10 and the nonvolatile memory device 22. The controller 21 is configured to access the nonvolatile memory device 22 in response to a request from the host 10. For example, the controller 21 may be configured to control read, write, erase and background operations of the nonvolatile memory device 22. The controller 21 may be configured to provide an interface between the nonvolatile memory device 22 and the host 10. The controller 21 may be configured to drive firmware for controlling the nonvolatile memory device 22.

During the segment cleaning process, the controller 21 is controlled by the host 10 to write back a clean segment composed of the live blocks to the free area located at the end of the log area and update the bitmap 640 accordingly. Here, of the bits included in the bitmap 640, bits corresponding to live blocks in the victim segments may be set to a value indicating an invalid block, and bits corresponding to live blocks in the clean segment may be set to a value indicating a live block.

The controller 21 further includes well-known components such as a random access memory (RAM), a processing unit, a host interface, and a memory interface. The RAM is used as at least one of an operation memory of the processing unit, a cache memory between the nonvolatile memory device 22 and the host 10, and a buffer memory between the nonvolatile memory device 22 and the host 10. The processing unit controls the overall operation of the controller 21.

The controller 21 may include a buffer 210. The buffer 210 may be a RAM, in particular, a DRAM.

The controller 21 and the nonvolatile memory device 22 may be integrated into one semiconductor device. Specifically, the controller 21 and the nonvolatile memory device 22 may be integrated into one semiconductor device to form a memory card. For example, the controller 21 and the nonvolatile memory device 22 may be integrated into one semiconductor device to form a personal computer (PC) card (e.g., Personal Computer Memory Card International Association (PCMCIA)), a compact flash card (CF), a smart media card (SM, SMC), a memory stick, a multimedia card (e.g., MMC, RS-MMC, MMCmicro), a SD card (e.g., SD, miniSD, micro SD, SDHC), or a universal flash storage (UFS).

Alternatively, the controller 21 and the nonvolatile memory device 22 may be integrated into one semiconductor device to form a solid state drive (SSD). The SSD includes a storage device which stores data in a semiconductor memory. When the SSD is connected to the host 10, the operation speed of the host 10 may increase significantly.

The nonvolatile memory device 22 or the storage device 20 may be mounted using various forms of packages. The nonvolatile memory device 22 or the storage device 20 may be mounted using packages such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline integrated circuit (SOIC), shrink small outline package (SSOP), thin small outline package (TSOP), thin quad flat pack (TQFP), system in package (SIP), multi chip package (MCP), wafer-level fabricated package (WFP), and wafer-level processed stack package (WSP).

Referring to FIG. 15, a storage device 20 includes a nonvolatile memory device 24 and a controller 23. The nonvolatile memory device 24 includes a plurality of nonvolatile memory chips. The nonvolatile memory chips form multiple memory chip groups. Each of the memory chip groups has one common channel for communication with the controller 23. For example, the nonvolatile memory chips may communicate with the controller 23 through first through kth channels CH1 through CHk.

In FIG. 15, a plurality of nonvolatile memory chips are connected to one channel. However, the storage device 20 can be modified such that one nonvolatile memory chip is connected to one channel.

Referring to FIG. 16, a system 3000 includes a central processing unit (CPU) 3100, a RAM 3200, a user interface 3300, a power supply 3400, and the storage device 20 of FIG. 14.

The system 3000 is electrically connected to the CPU 3100, the RAM 3200, the user interface 3300, and the power supply 3400 through a system bus 3500. Data provided through the user interface 3300 or processed by the CPU 3100 is stored in the system 3000.

In FIG. 16, a nonvolatile memory device 24 is connected to the system bus 3500 through a controller 23. However, the nonvolatile memory device 24 can also be connected directly to the system bus 3500.

Figure 17:
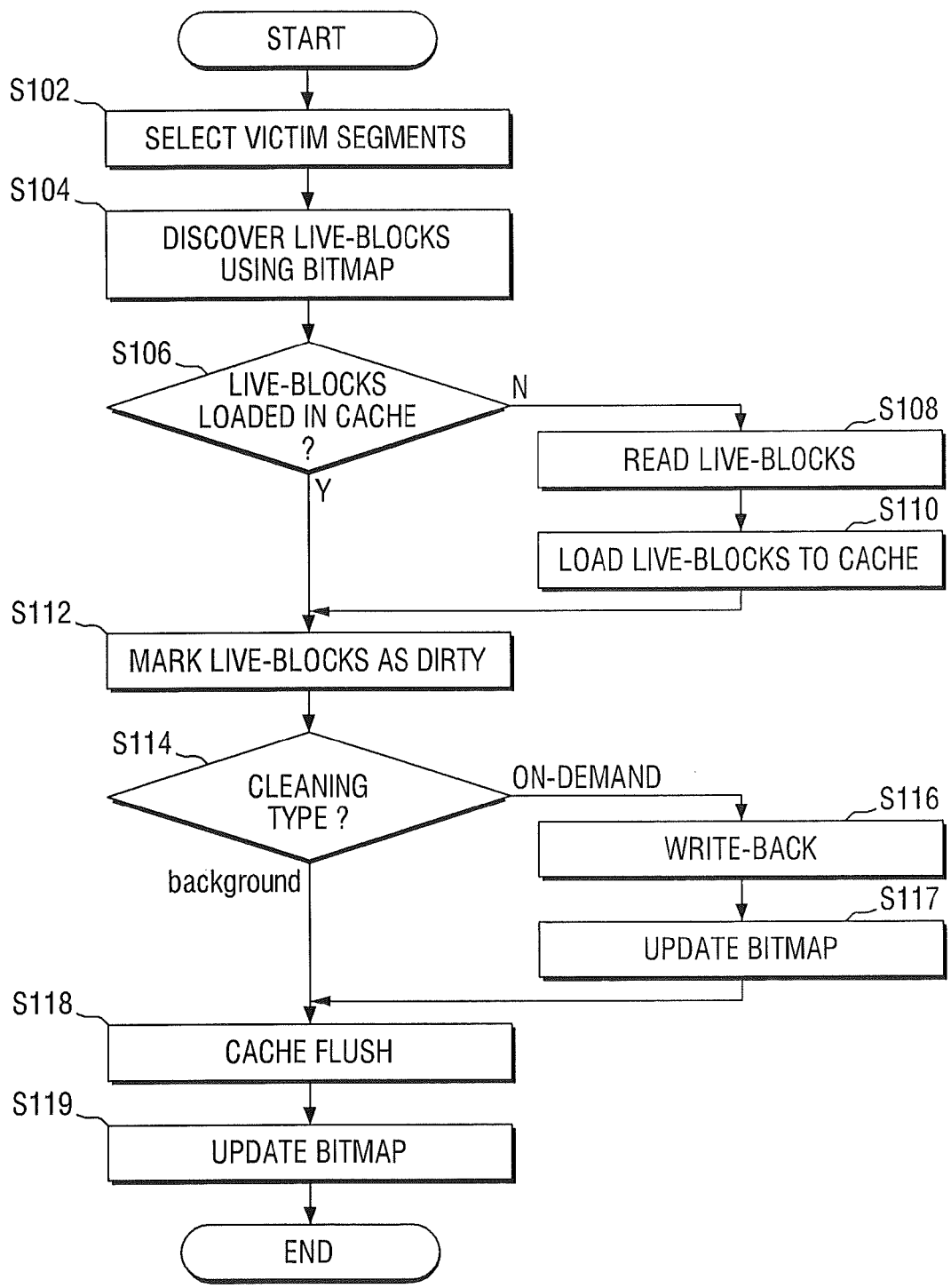
FIG. 17 is a flowchart illustrating a segment cleaning method according to an embodiment of the present inventive concepts.

A segment cleaning method using a bitmap according to an embodiment of the present inventive concepts will now be described with reference to FIGS. 17 through 20. FIG. 17 is a flowchart illustrating the segment cleaning method using the bitmap according to an embodiment of the present inventive concepts.

Referring to FIG. 17, victim segments to be returned to a free area are selected from a plurality of segments included in a log area (operation S102). A method of selecting the victim segments will now be described in greater detail with reference to FIGS. 18 through 20.

First, a method of selecting the victim segments according to an embodiment of the present inventive concepts will be described with reference to FIG. 18.

Figure 18:
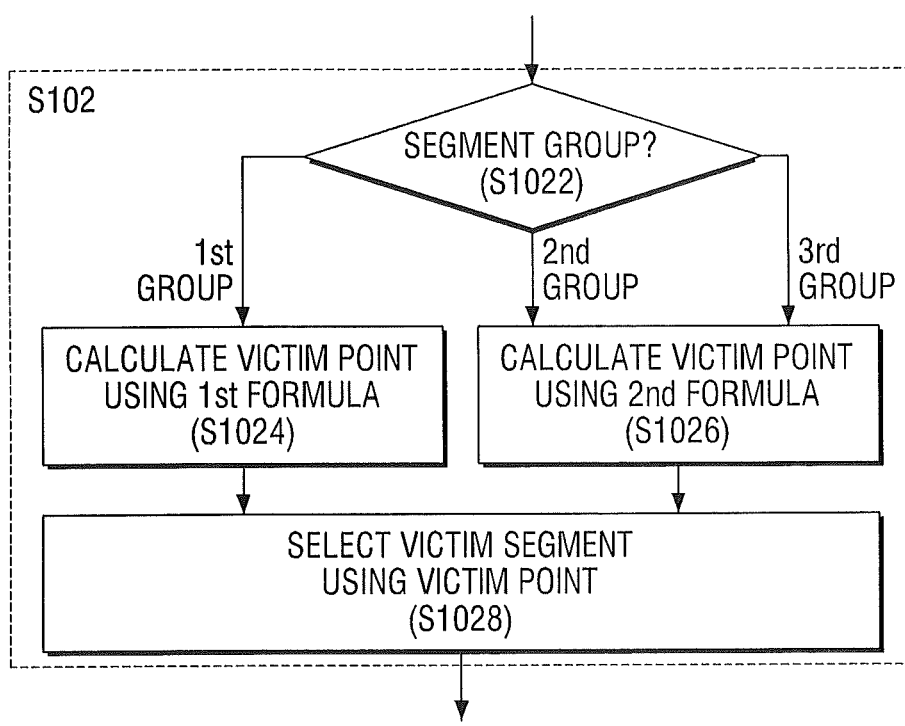
FIGS. 18 through 20 are detailed flowcharts illustrating some operations in the segment cleaning method of FIG. 17.

Operations illustrated in FIG. 18 are performed on all segments included in the log area. That is, a segment group to which each segment belongs is identified using a segment address (operation S1022). Then, victim points are calculated using a first victim point calculation formula when the identified segment group is a first segment group (operation S1024) and using a second victim point calculation formula when the identified segment group is a second segment group or a third segment group (operation S1026). Based on the victim points, a predetermined number of victim segments are selected from all segments included in the log area.

Figure 19:
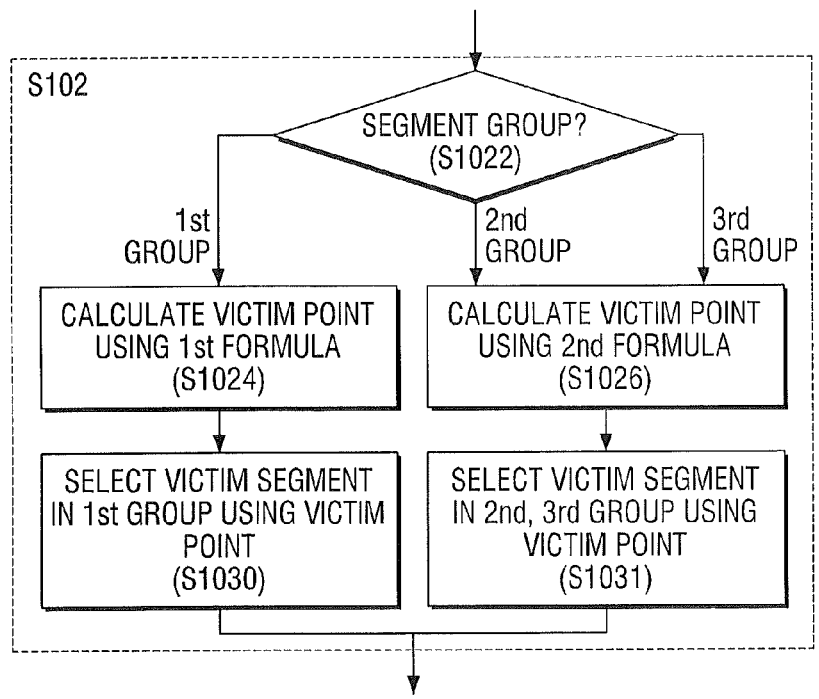

A method of selecting the victim segments according to another embodiment of the present inventive concepts will be described with reference to FIG. 19. Unlike in the embodiment of FIG. 18, in the embodiment of FIG. 19, a predetermined victim segments may be selected from a first segment group (operation S1030), and a predetermined victim segments may be selected from second and third segment groups (operation S1031). The embodiment of FIG. 19 can prevent more victim segments from being selected from the first segment group or the second and third segment groups due to the point calculation imbalance between the first and second victim point calculation formulas.

Figure 20:
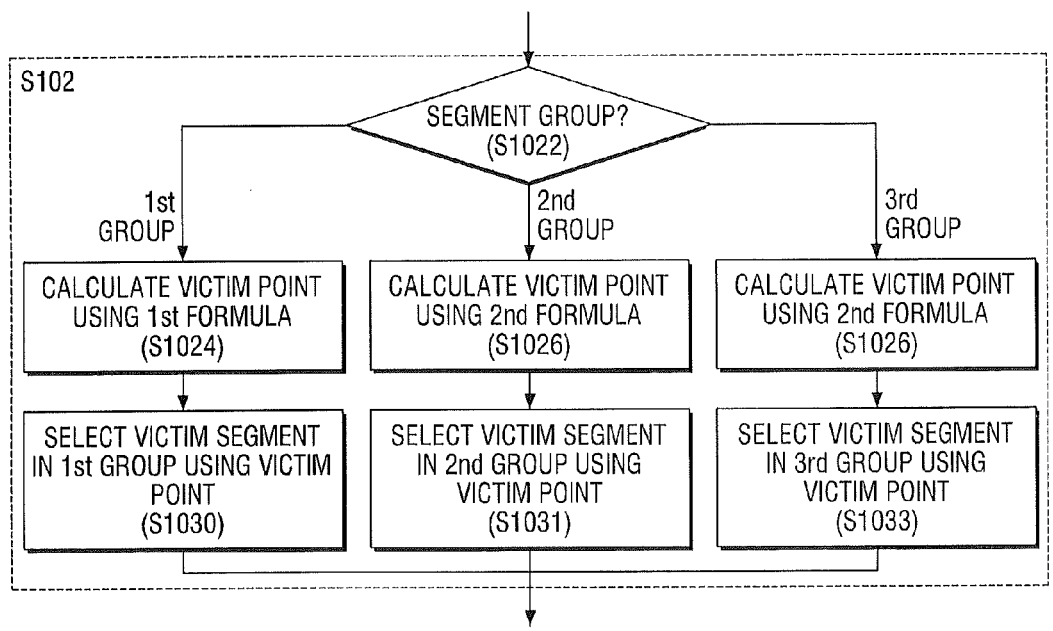

A method of selecting the victim segments according to another embodiment of the present inventive concepts will be described with reference to FIG. 20. Unlike in the embodiment of FIG. 19, in the embodiment of FIG. 20, a predetermined victim segments may be selected from a second segment group (operation S1032), and a predetermined number of victim segments may be selected from a third segment group (operation S1033). The embodiment of FIG. 20 can ensure that a predetermined number of segments are selected from each of the first through third segment groups.

Referring back to FIG. 17, live blocks storing valid data are discovered from among blocks included in the victim segments (operation S104). Whether a block is a live block can be identified by referring to bitmap data, which indicates whether each block is a live block, from among metadata stored in an area different from the log area.

It is checked whether each of the discovered live blocks is already loaded in a WB cache (operation S106). A file ID and offset information of each live block can be obtained from a parent node of the live block, and information about the parent node can be obtained from the metadata. Therefore, whether each live block is already loaded in the WB cache can be checked using the file ID and the offset information.

When the live blocks are not loaded in the WB cache, they are read (operation S108), and the read live blocks are loaded to the WB cache (operation S110).

A module which manages the WB cache is requested to set dirty bits for the live blocks loaded in the WB cache (operation S112). As a result, when performing a flush operation, the WB cache writes back the loaded live blocks at the end of the log area (operation S118). That is, there is no need to perform a write-back operation for a segment cleaning process because the flush operation achieve the object of the write-back operation. Furthermore, the function of the WB cache itself allows blocks included in the same file can be written back adjacent to each other.

By the nature of the WB cache, the time when the live blocks are loaded may be different from the time when the live blocks are flushed. If the segment cleaning process is of a background type, such a time gap can be accepted. However, if the segment cleaning process is of an on-demand type which is performed due to a lack of space in the free area, waiting until the flush time can delay a write operation. Therefore, according to the current embodiment, when the segment cleaning process is of the on-demand type, the WB cache may be requested to immediately write back the live blocks (operation S116).

After the writing back of the live blocks (operation S116), the returning of the victim segments to the free area and the writing back of the live blocks may be reflected in the bitmap. That is, of bits included in the bitmap, bits corresponding to the live blocks in the victim segments may be set to a value indicating an invalid block, and bits corresponding to the live blocks in a clean segment may be set to a value indicating a live block.

Even when the writing back of the live blocks is accomplished by the flushing of the WB cache (operation S118), the returning of the victim segments to the free area and the writing back of the live blocks are also reflected in the bitmap.

While the present inventive concepts have been particularly shown and described with reference to example embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A host comprising:
    an interface configured to relay data exchange with a storage device; and
    a file system module configured to perform a segment cleaning process by performing operations comprising selecting victim segments from a plurality of segments stored in the storage device, discovering live blocks in the victim segments, writing back the discovered live blocks to the storage device through the interface, and returning the victim segments to a free area, wherein the file system module is further configured to perform operations comprising calculating victim points for segments included in a first segment group using a first victim point calculation formula, calculating victim points for segments included in a second segment group using a second victim point calculation formula, calculating victim points for segments included in a third segment group using the second victim point calculation formula and selecting the victim segments based on the victim points, wherein the second segment group consists of segments which comprise data written when the data included in the segments of the first segment group is updated, the third segment group comprises the written-back data, the first victim point calculation formula uses a proportion of live blocks relative to the total number of blocks included in a segment and an age calculated using a modification time of a last modified one of the blocks included in the segment, and the second victim point calculation formula uses the proportion of live blocks relative to the total number of blocks included in a segment, but does not use the age calculated using a modification time of a last modified one of the blocks included in the segment.

2. The host of claim 1, wherein the first segment group consists of segments located in a first address area, and the second segment group consists of segments located in a second address area different from the first address area.

3. The host of claim 1, wherein the first victim point calculation formula is defined by:

$$\text{victim point} = \frac{(1-u)*\text{age}}{(1+u)},$$

where u is the proportion of live blocks relative to the total number of blocks included in a segment.

4. The host of claim 1, wherein the second victim point calculation formula uses a value obtained by dividing the number of live blocks by the total number of blocks included in a segment.

5. The host of claim 1, wherein the file system module is further configured to perform operations comprising selecting a predetermined number of victim segments from a respective section based on the victim points, wherein a respective section consists of a predetermined number of segments.

6. The host of claim 1, wherein the file system module is further configured to perform operations comprising managing the storage device by dividing the storage device into a first area which is written in a random access manner and a second area to which the segments are written in a sequential access manner, and performing the segment cleaning process such that the live blocks are written back to the free area located at the end of a log area.

7. A segment cleaning method comprising:
 selecting victim segments from a plurality of segments stored in a storage device;
 discovering live blocks in the victim segments;
 writing back the discovered live blocks to the storage device; and
 returning the victim segments to a free area,
 wherein the selecting the victim segments comprises:
  calculating victim points for segments included in a first segment group using a first victim point calculation formula;
  calculating victim points for segments included in a second segment group using a second victim point calculation formula;
  calculating victim points for segments in a third segment group using the second victim point calculation formula; and
  selecting the victim segments based on the victim points,
 wherein the second segment group consists of segments which comprise data written when the data included in the segments of the first segment group is updated, the third segment group comprises the written-back data, the first victim point calculation formula uses a proportion of live blocks relative to the total number of blocks included in a segment and an age calculated using a modification time of a last modified one of the blocks included in the segment, and the second victim point calculation formula uses the proportion of live blocks relative to the total number of blocks included in a segment, but does not use the age calculated using modification time of a last modified one of the blocks included in the segment.

8. The segment cleaning method of claim 7, wherein the selecting of the victim segments based on the victim points comprises:
 selecting a predetermined number of victim segments from the first segment group;
 selecting a predetermined number of victim segments from the second segment group; and
 selecting a predetermined number of victim segments from the third segment group.

* * * * *